(12) United States Patent
Wood et al.

(10) Patent No.: US 11,939,837 B2
(45) Date of Patent: Mar. 26, 2024

(54) ELECTRO-MECHANICAL CLUTCH FOR DOWNHOLE TOOLS

(71) Applicant: Halliburton Energy Services, Inc., Houston, TX (US)

(72) Inventors: Nicholas Robert Wood, Carrollton, TX (US); Kevin Robin Passmore, Carrollton, TX (US); Bruce Edward Scott, Carrollton, TX (US); Jon-Howard Elliott Hanson, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 134 days.

(21) Appl. No.: 17/848,928

(22) Filed: Jun. 24, 2022

(65) Prior Publication Data
US 2023/0417125 A1 Dec. 28, 2023

(51) Int. Cl.
| | | |
|---|---|---|
| *E21B 34/06* | (2006.01) | |
| *E21B 34/08* | (2006.01) | |
| *E21B 34/14* | (2006.01) | |
| *F16D 11/16* | (2006.01) | |
| *F16D 27/09* | (2006.01) | |
| *F16D 27/14* | (2006.01) | |

(52) U.S. Cl.
CPC ............ *E21B 34/066* (2013.01); *E21B 34/08* (2013.01); *E21B 34/14* (2013.01); *F16D 11/16* (2013.01); *F16D 27/09* (2013.01); *F16D 27/14* (2013.01)

(58) Field of Classification Search
CPC ........ E21B 34/14; E21B 34/08; E21B 34/066; F16D 27/09; F16D 27/14; F16D 11/16; F16D 2023/123; F16D 27/118; F16D 11/14
See application file for complete search history.

(56) References Cited

U.S. PATENT DOCUMENTS

| | | | | |
|---|---|---|---|---|
| 3,684,068 A | * | 8/1972 | Ford | F16D 27/105 |
| | | | | 192/81 C |
| 3,713,519 A | * | 1/1973 | Ruget | F16D 27/02 |
| | | | | 192/84.95 |
| 4,638,899 A | * | 1/1987 | Kossett | F16D 27/105 |
| | | | | 192/81 C |

(Continued)

FOREIGN PATENT DOCUMENTS

| | | | | |
|---|---|---|---|---|
| CN | 108590624 A | * | 9/2018 | ............ E21B 17/22 |
| CN | 109667845 A | * | 4/2019 | ............ E21B 47/00 |

(Continued)

*Primary Examiner* — Daniel P Stephenson
(74) *Attorney, Agent, or Firm* — Scott Richardson; Parker Justiss, P.C.

(57) ABSTRACT

Provided is a clutch assembly, a SSSV, and a method for operating an SSSV. The clutch assembly, in one aspect, includes an output coupler housing, an input shaft, and an electromagnet coupled to the input shaft. In at least one aspect, the electromagnet is configured to axially translate the output coupler housing from a de-coupled state to a coupled state when the electromagnet is energized. The clutch assembly, in one aspect, further includes one or more grooves located in one of an outer surface of the input shaft or an inner surface of the central opening, and one or more engagement members located in the other of the inner surface of the central opening or the outer surface of the input shaft.

20 Claims, 15 Drawing Sheets

(56) References Cited

U.S. PATENT DOCUMENTS

| | | | | |
|---|---|---|---|---|
| 4,895,343 | A * | 1/1990 | Sato | F02D 11/107 |
| | | | | 123/399 |
| 5,931,250 | A * | 8/1999 | Kagawa | B62D 1/28 |
| | | | | 74/552 |
| 9,291,033 | B2 | 3/2016 | Scott et al. | |
| 2002/0108747 | A1 | 8/2002 | Dietz et al. | |
| 2003/0057792 | A1 * | 3/2003 | Yang | H02K 16/00 |
| | | | | 310/191 |
| 2005/0173219 | A1 * | 8/2005 | Bittner | E05F 15/603 |
| | | | | 192/84.31 |
| 2007/0246322 | A1 * | 10/2007 | Schachtl | F16D 27/06 |
| | | | | 192/84.31 |
| 2011/0186303 | A1 | 8/2011 | Scott et al. | |
| 2013/0199791 | A1 | 8/2013 | Hill, Jr. et al. | |
| 2014/0151019 | A1 | 6/2014 | Gano | |
| 2017/0031282 | A1 * | 2/2017 | Yamaguchi | G03G 15/6529 |
| 2019/0153785 | A1 | 5/2019 | Samuel et al. | |
| 2020/0370394 | A1 * | 11/2020 | Cai | E21B 34/066 |
| 2021/0293293 | A1 | 9/2021 | Krause | |
| 2022/0178405 | A1 * | 6/2022 | Sato | F16D 27/112 |

FOREIGN PATENT DOCUMENTS

| | | |
|---|---|---|
| KR | 100461820 A | 12/2004 |
| WO | 2011094084 A2 | 8/2011 |
| WO | 2021048225 A1 | 3/2021 |
| WO | 2021173684 A1 | 9/2021 |
| WO | WO-2022197666 A1 * | 9/2022 |

* cited by examiner

ELECTRO-MECHANICAL CLUTCH FOR DOWNHOLE TOOLS

BACKGROUND

Subsurface safety valves (SSSVs) are well known in the oil and gas industry and provide one of many failsafe mechanisms to prevent the uncontrolled release of subsurface production fluids, should a wellbore system experience a loss in containment. Typically, SSSVs comprise a portion of a tubing string, the entirety of the SSSVs being set in place during completion of a wellbore. Although a number of design variations are possible for SSSVs, the vast majority are flapper-type valves that open and close in response to longitudinal movement of a bore flow management actuator.

Since SSSVs provide a failsafe mechanism, the default positioning of the flapper valve is usually closed in order to minimize the potential for inadvertent release of subsurface production fluids. The flapper valve can be opened through various means of control from the earth's surface in order to provide a flow pathway for production to occur. What is needed in the art is an improved SSSV that does not encounter the problems of existing SSSVs.

BRIEF DESCRIPTION

Reference is now made to the following descriptions taken in conjunction with the accompanying drawings, in which.

Figure 6A:
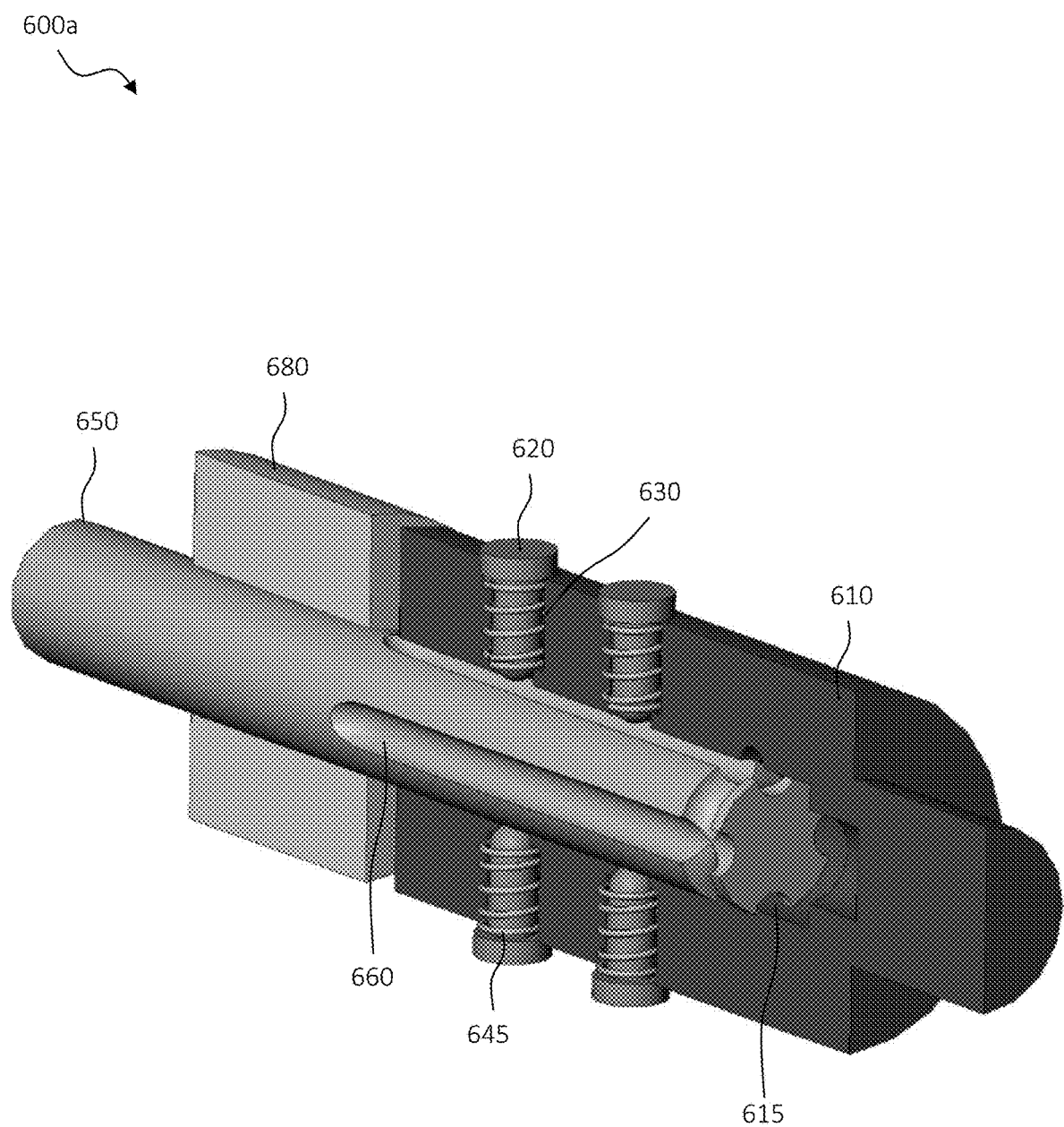
FIGS. 6A and 6B illustrate one embodiment of a clutch assembly, as might form part of an SSSV (e.g., SSSV of FIG. 1 or SSSV of FIGS. 2 through 4), designed and manufactured according to an alternative embodiment of the present disclosure.
Figure 6B:
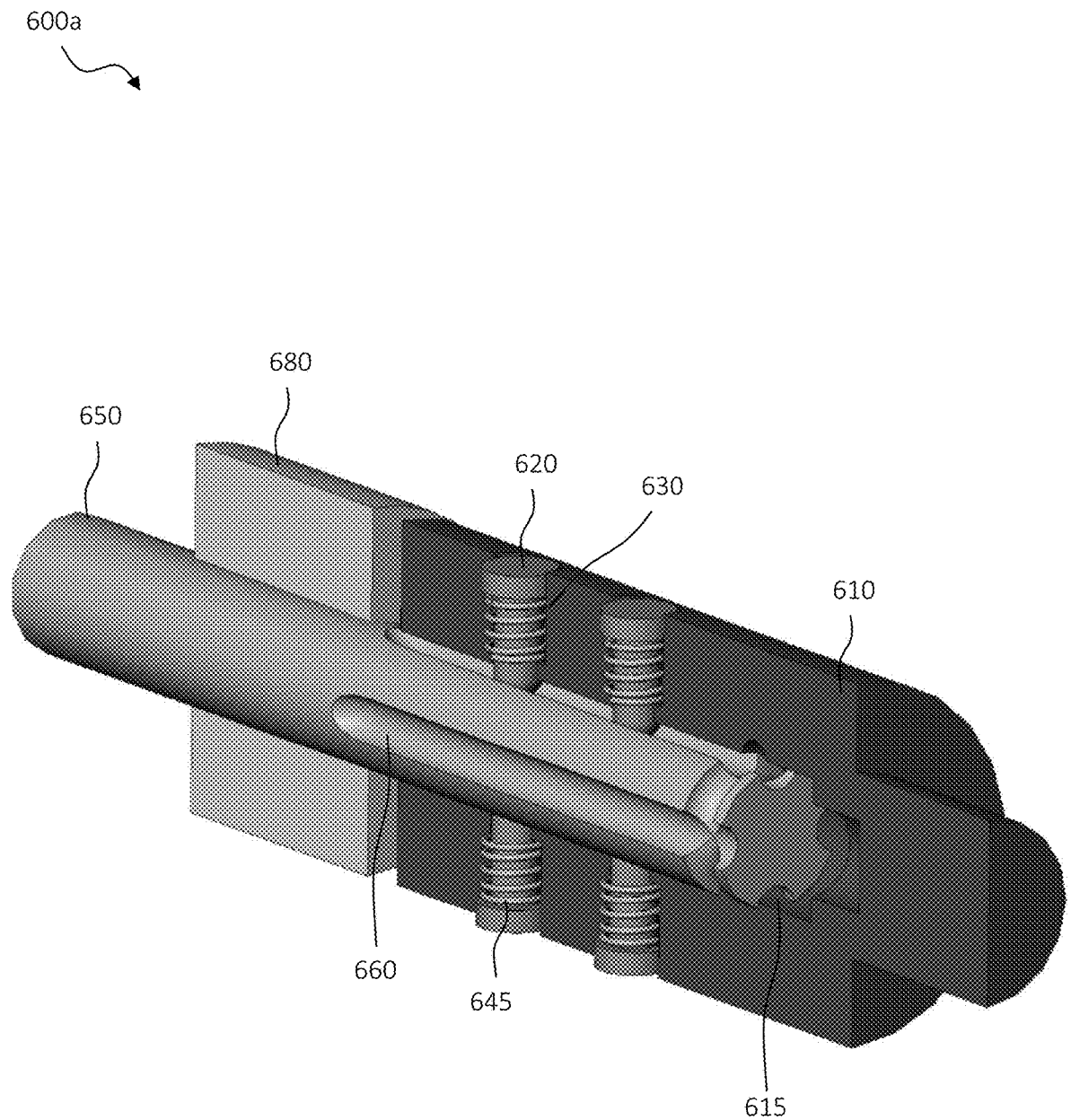
Figure 6C:
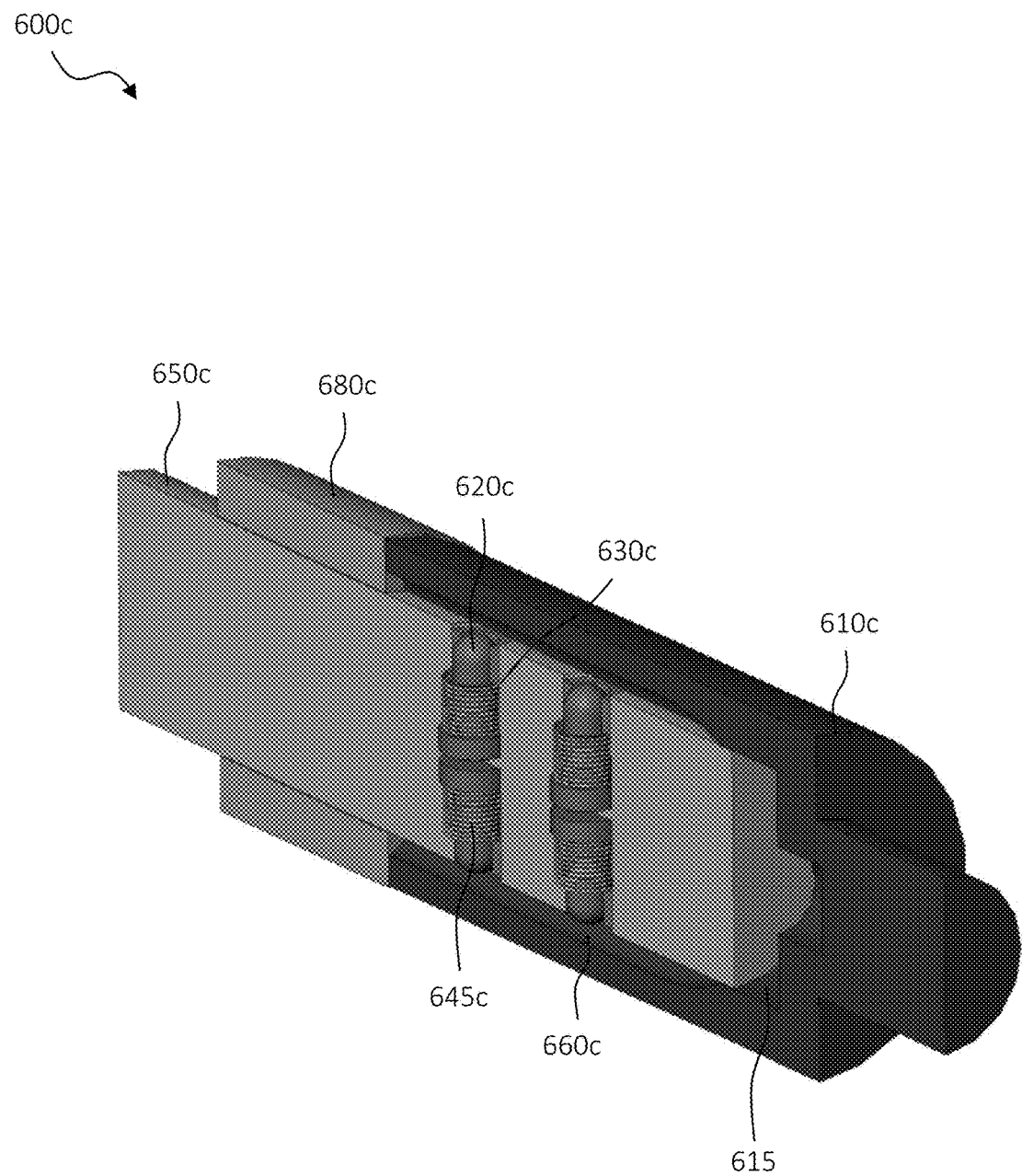
Figure 6D:
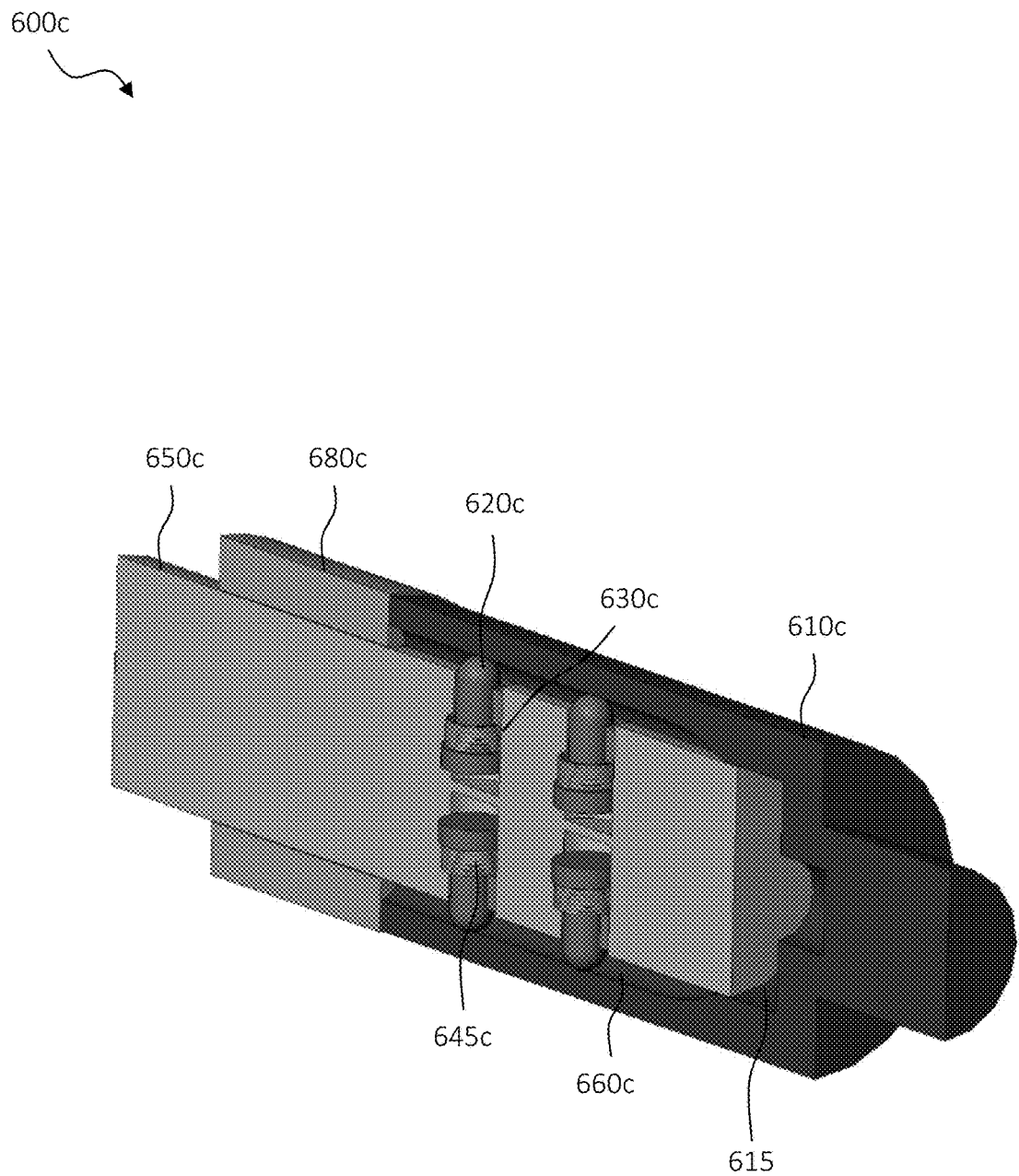
Figure 7A:
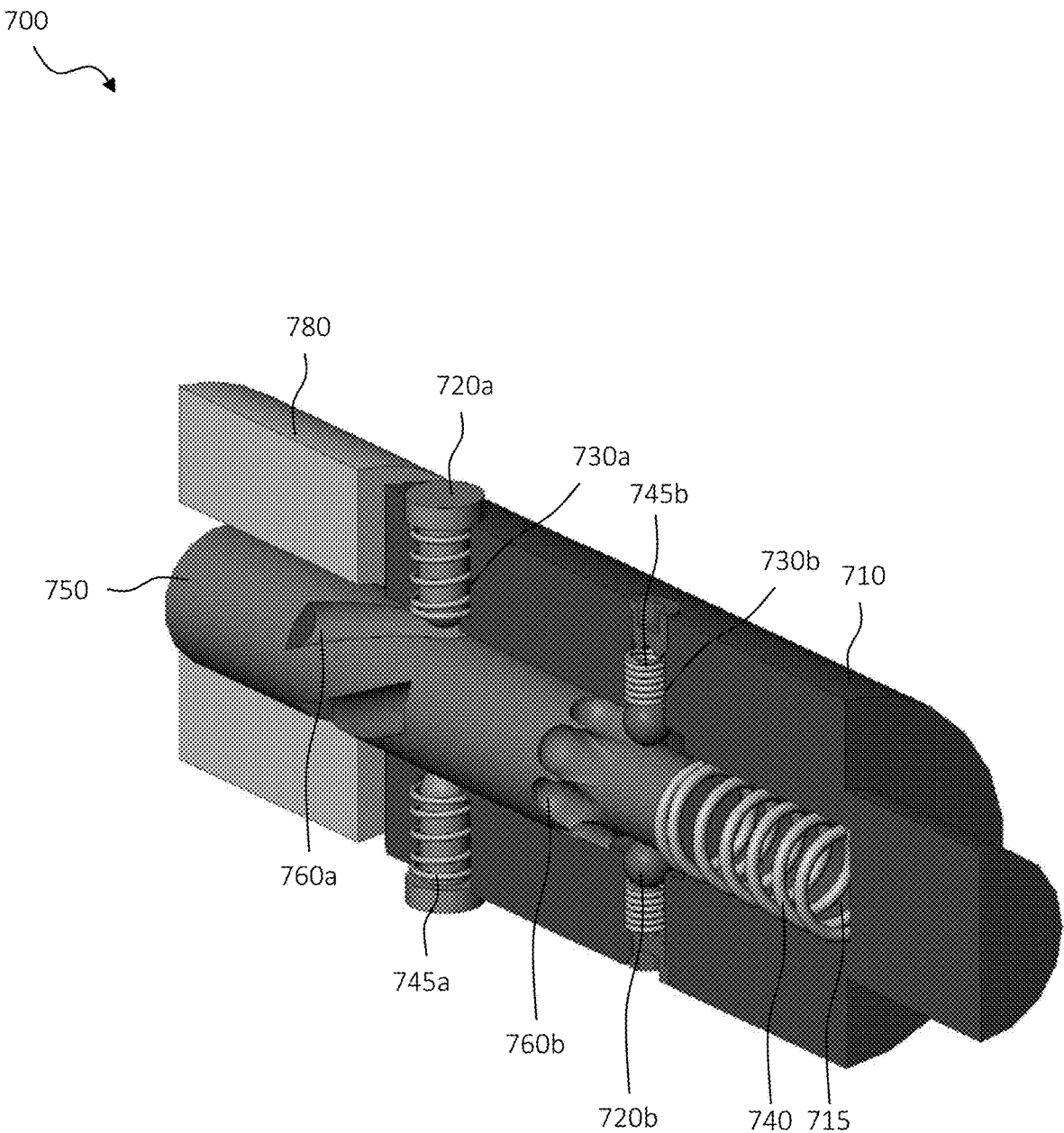
Figure 7B:
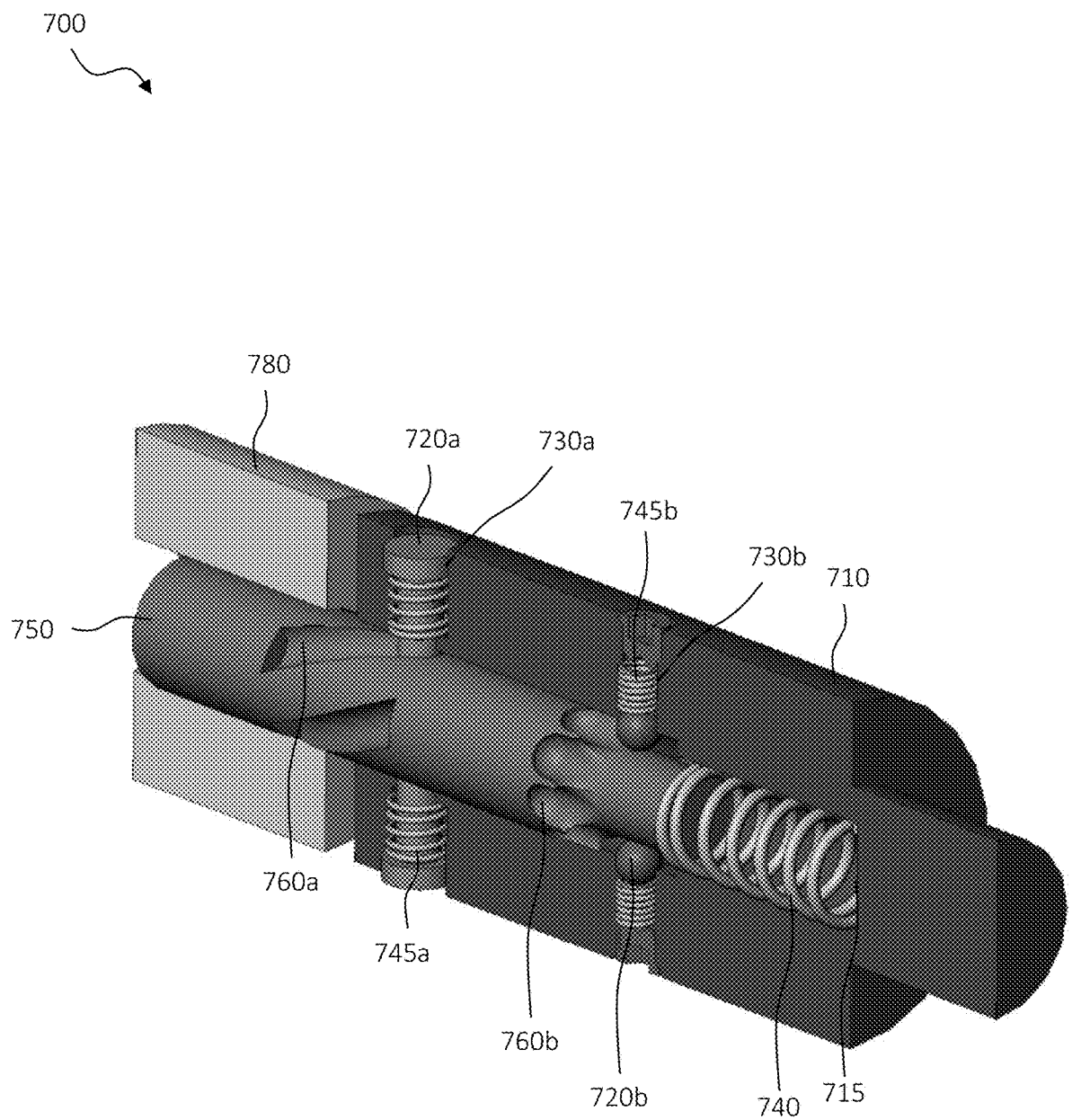
Figure 7C:
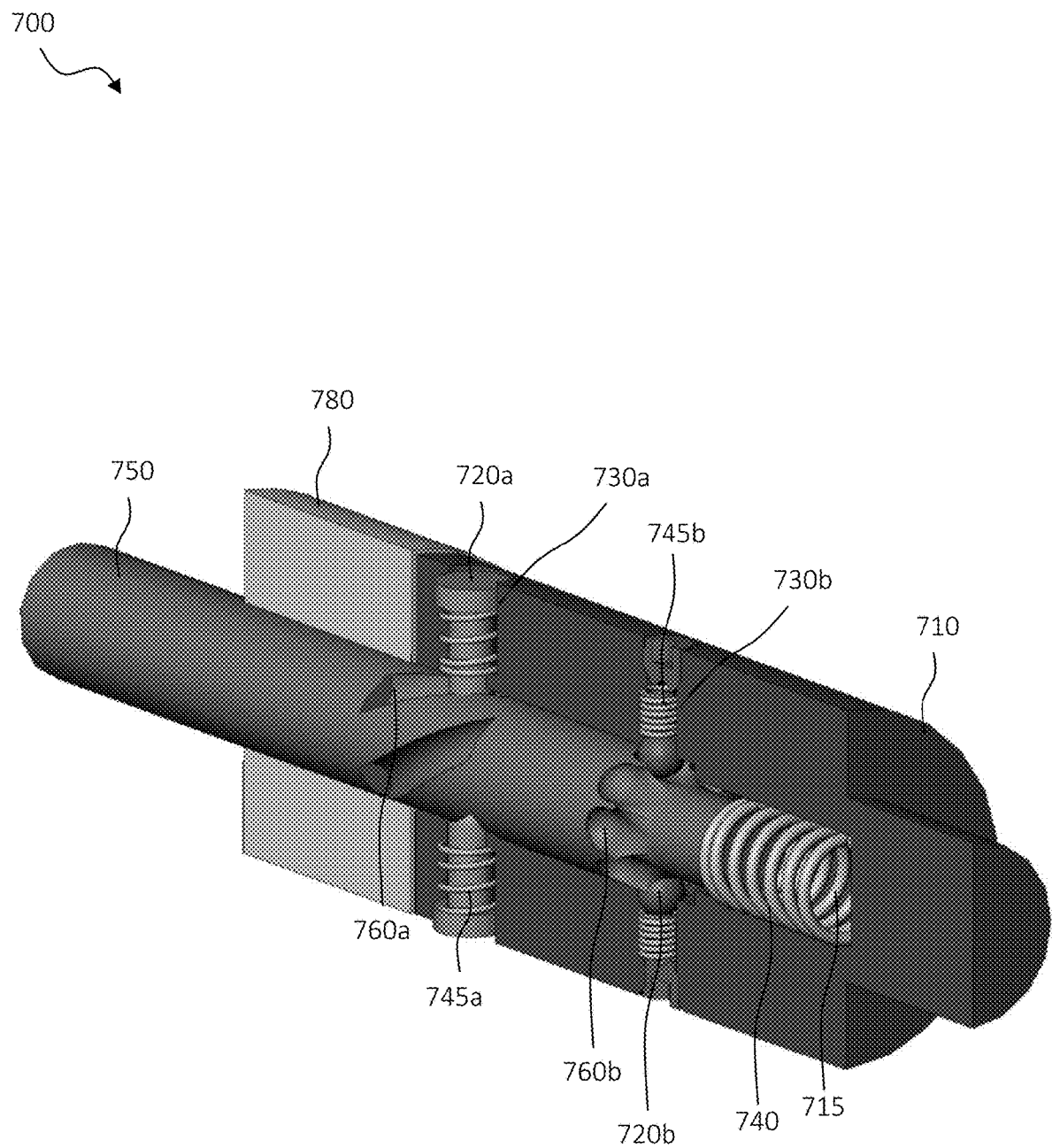

FIGS. 6C and 6D illustrate one embodiment of a clutch assembly, as might form part of an SSSV (e.g., SSSV of FIG. 1 or SSSV of FIGS. 2 through 4), designed and manufactured according to an alternative embodiment of the present disclosure; and FIGS. 7A through 7C illustrate one embodiment of a clutch assembly, as might form part of an SSSV (e.g., SSSV of FIG. 1 or SSSV of FIGS. 2 through 4), designed and manufactured according to yet another alternative embodiment of the present disclosure.

DETAILED DESCRIPTION

In the drawings and descriptions that follow, like parts are typically marked throughout the specification and drawings with the same reference numerals, respectively. The drawn figures are not necessarily, but may be, to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally away from the bottom, terminal end of a well, regardless of the wellbore orientation; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical or horizontal axis. Unless otherwise specified, use of the term "subterranean formation" shall be construed as encompassing both areas below exposed earth and areas below earth covered by water, such as ocean or fresh water.

Figure 1:
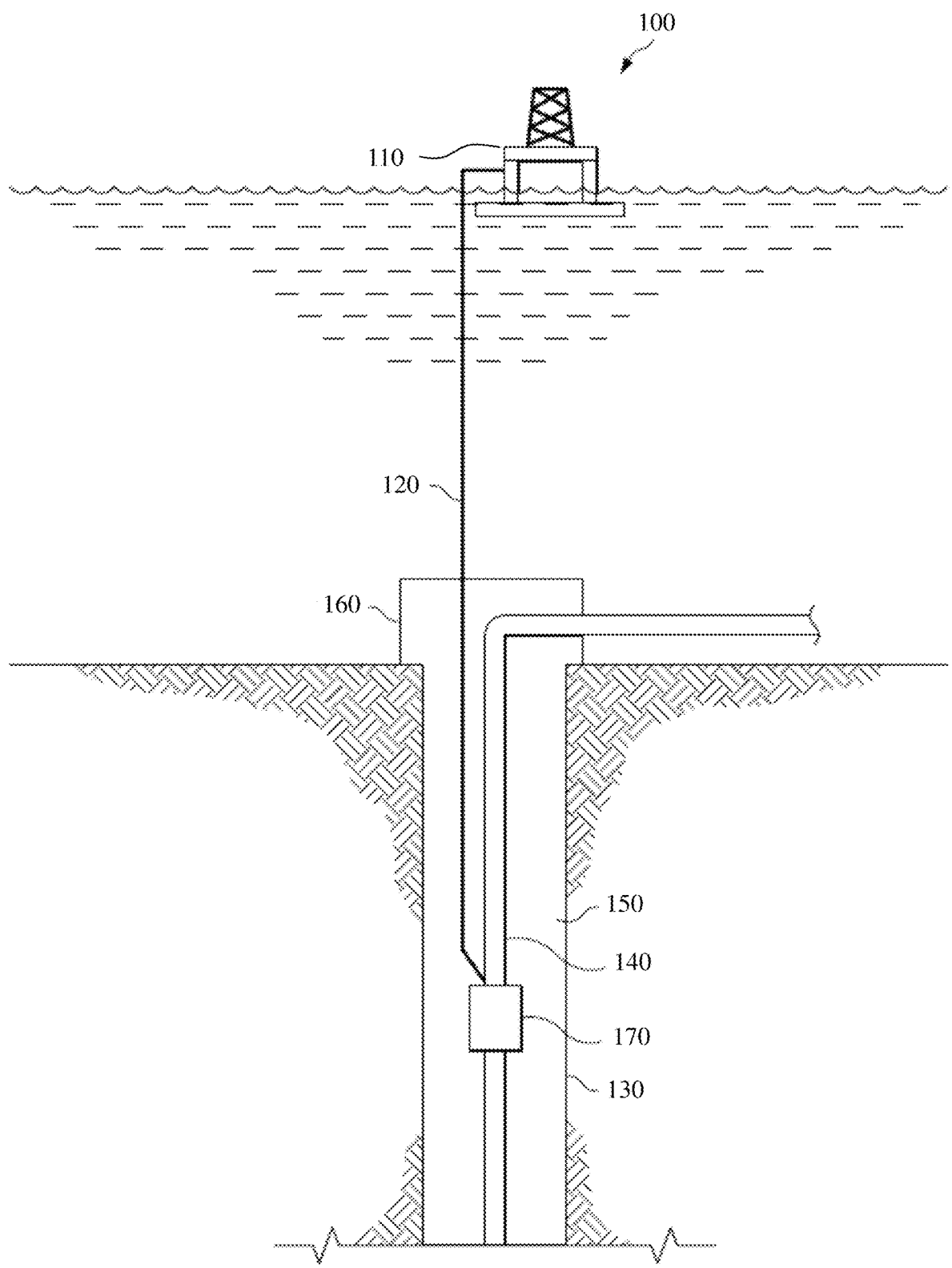
FIG. 1 illustrates a well system designed, manufactured and/or operated according to one or more embodiments of the disclosure.

FIG. 1 illustrates a well system 100 designed, manufactured and/or operated according to one or more embodiments of the disclosure. The well system 100, in at least one embodiment, includes an offshore platform 110 connected to an SSSV 170 via a control line 120 (e.g., electrical control line, hydraulic control line, etc.). An annulus 150 may be defined between walls of a wellbore 130 and a conduit 140. A wellhead 160 may provide a means to hand off and seal conduit 140 against the wellbore 130 and provide a profile to latch a subsea blowout preventer to. Conduit 140 may be coupled to the wellhead 160. Conduit 140 may be any conduit such as a casing, liner, production tubing, or other oilfield tubulars disposed in a wellbore.

The SSSV 170, or at least a portion thereof, may be interconnected in conduit 140 and positioned in the wellbore 130. Although the well system 100 is depicted in FIG. 1 as an offshore well system, one of ordinary skill should be able to adopt the teachings herein to any type of well, including onshore or offshore. The control line 120 may extend into the wellbore 130 and may be connected to the SSSV 170. The control line 120 may provide actuation power to the SSSV 170. As will be described in further detail below, power may be provided to the SSSV 170 to actuate or de-actuate the SSSV 170. Actuation may comprise opening the SSSV 170 to provide a flow path for subsurface production fluids to enter conduit 140, and de-actuation may comprise closing the SSSV 170 to close a flow path for subsurface production fluids to enter conduit 140. While the embodiment of FIG. 1 illustrates only a single SSSV 170, other embodiments exist wherein multiple SSSVs 170 according to the disclosure are used.

Figure 2:
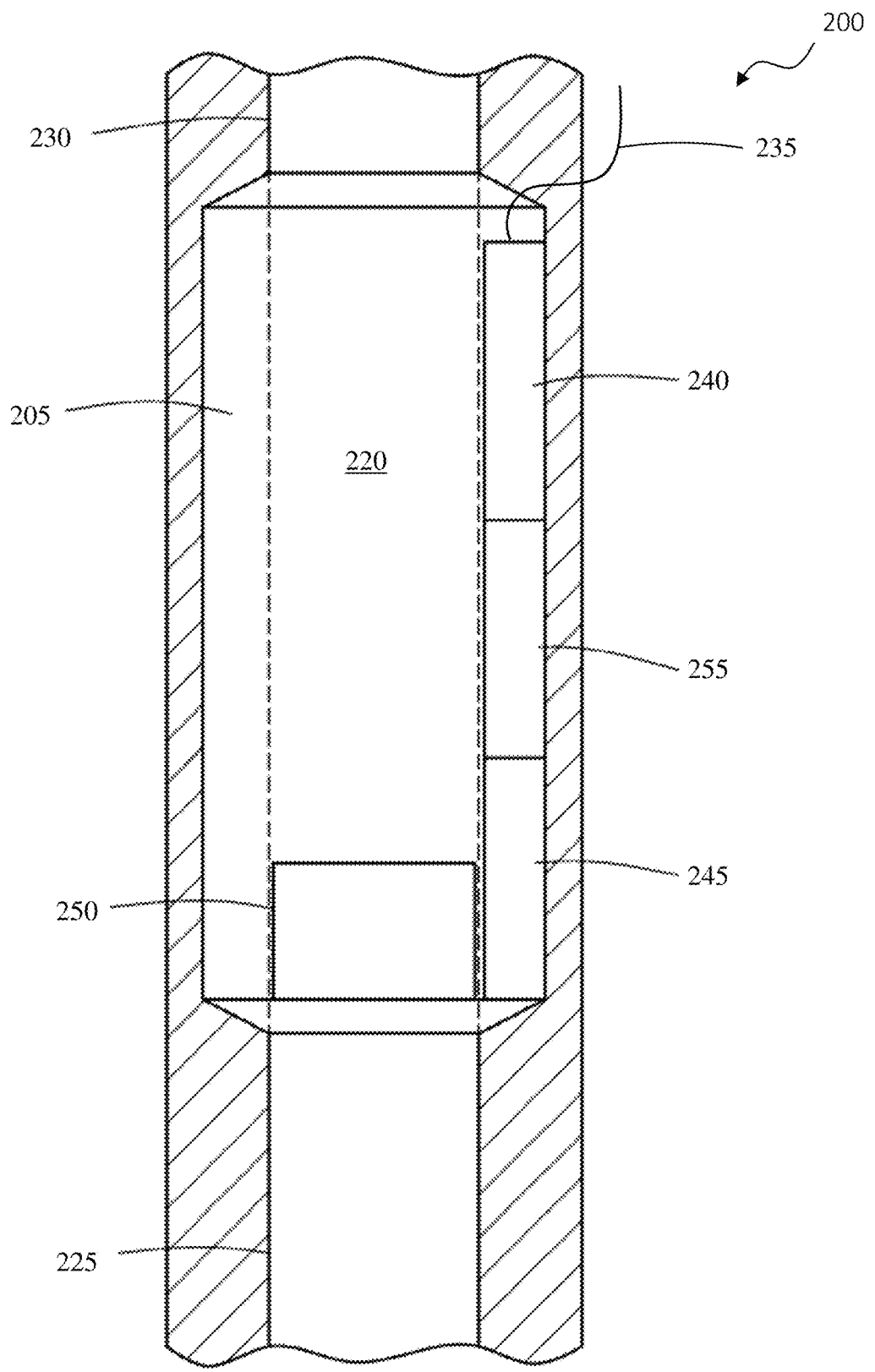
FIGS. 2 through 4 illustrate one embodiment of an SSSV designed, manufactured and/or operated according to one or more embodiments of the disclosure.
Figure 3:
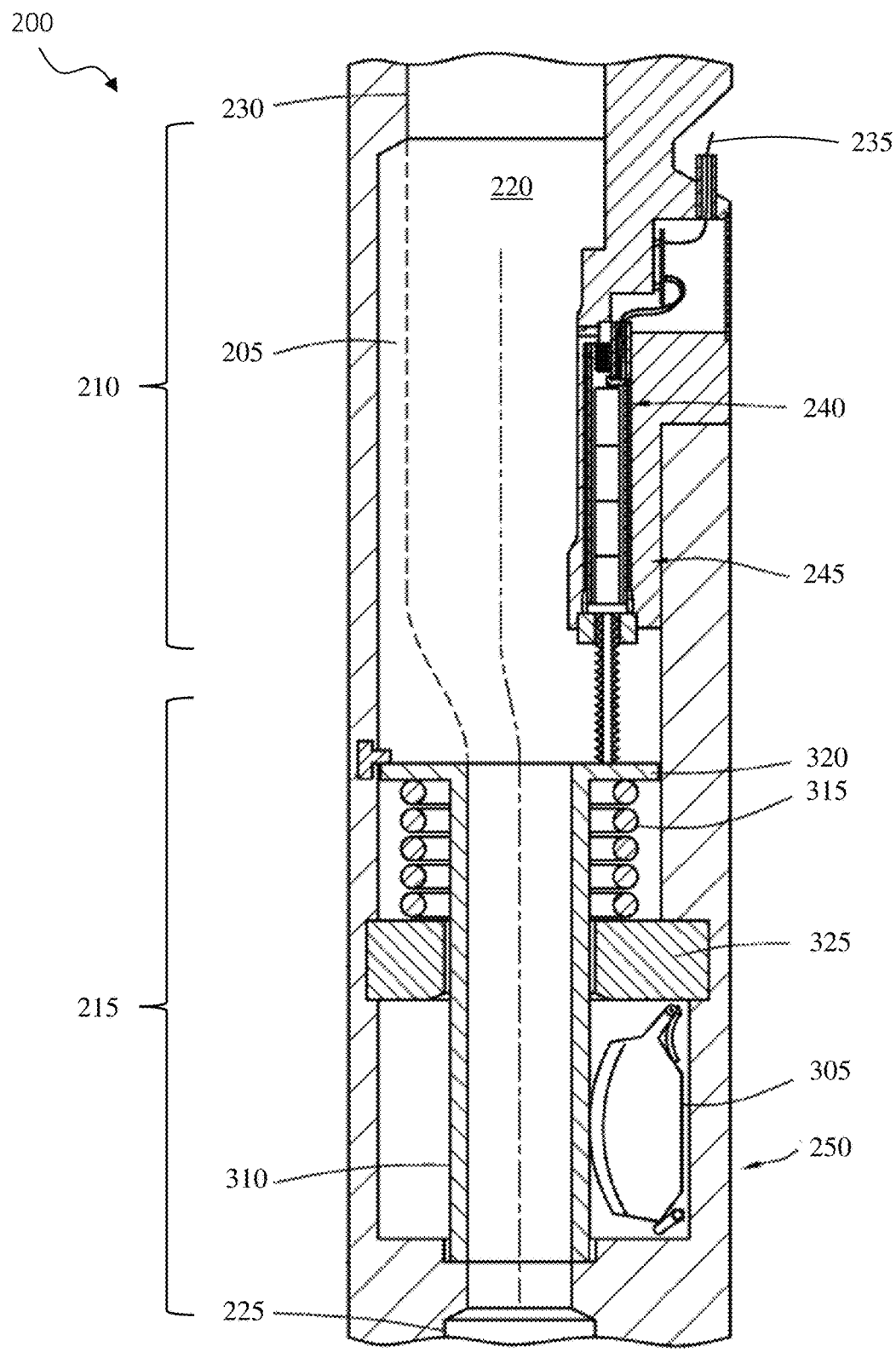
Figure 4:
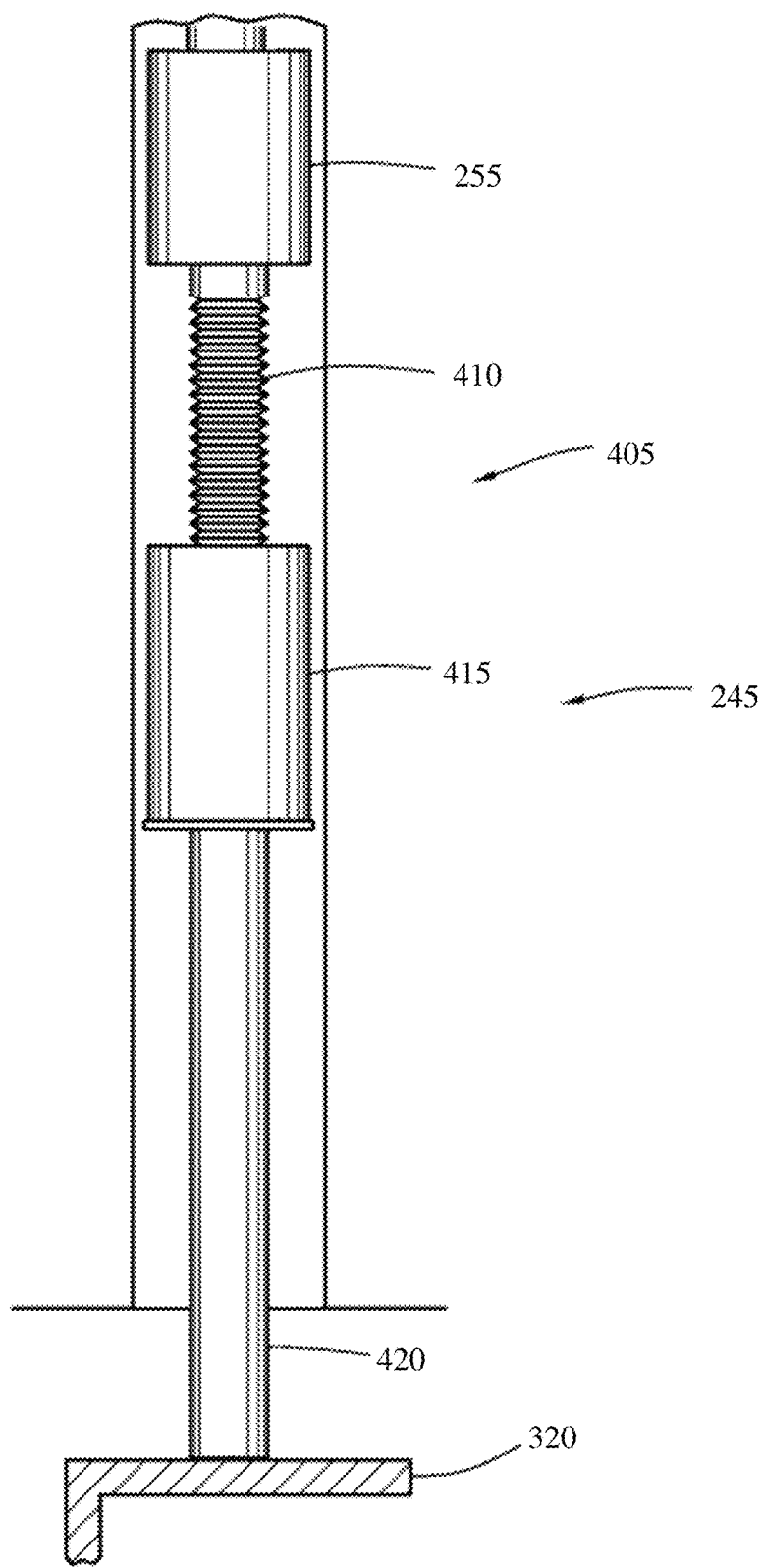

Referring now to FIGS. 2 through 4, illustrated is one embodiment of an SSSV 200 designed, manufactured and/or operated according to one or more embodiments of the disclosure. In the illustrated embodiment, the SSSV 200 includes a valve body 205 having an upper assembly 210, a lower assembly 215, and a longitudinal bore 220 extending through the length of the valve body 205. In at least one embodiment, the valve body 205 is coupled to production tubing (e.g., the conduit 130 of FIG. 1). The longitudinal bore 220 forms a passageway for fluid to flow between the lower section 225 and the upper section 230 of the valve body 205.

The SSSV 200 can further include a drive assembly 240 (e.g., electric motor, hydraulic motor, etc.) coupled to a bore closure assembly 250. As used herein, a drive assembly 240 means a drive configuration in which the driving force need only overcome the resistance force that normally biases the bore closure assembly 250 to a closed or other position (for instance, the force of spring 315 as illustrated in FIG. 3). The drive assembly 240 uses a mechanical linkage 245 to drive the bore closure assembly 250 to an open position in response to a control signal (e.g., an electrical signal sent to an electric motor via an electrical control line 235, among others).

A clutch assembly 255 designed, manufactured and/or operated according to one or more embodiments of the disclosure may be positioned between the drive assembly 240 and the mechanical linkage 245. In at least one embodiment, the clutch assembly 255 includes an electromagnetic (e.g., including an electromagnetic coil) coupled to an input shaft thereof. The electromagnet, in at least one embodiment, is configured to couple and/or de-couple the input shaft from an output coupler housing using a variety of different mechanism, depending on the design thereof. Accordingly, the electromagnet, and associated engagement members and grooves, may be used to allow the input shaft and the output coupler housing to freely rotate relative to one another when in the de-coupled state, but rotationally fix the input shaft and the output coupler housing relative to one another when in the coupled state.

While drive assembly 240, clutch assembly 255, and mechanical linkage 245 are shown as separate components in FIG. 2, it should be understood that these three assemblies can be integrated into fewer than three components. For example, a single drive/clutch/linkage component, two components such as a drive/clutch component coupled to a linkage component, or a drive component coupled to a clutch/linkage component, among others, could be included in these SSSVs 200. In some embodiments, drive assembly 240, clutch assembly 255, and mechanical linkage 245 are housed in the upper assembly 210 of SSSV 200 and the bore closure assembly 250 is housed in the lower assembly 215 of SSSV 200.

In the embodiment shown in FIG. 3, the bore closure assembly 250 is a flapper valve disposed within the longitudinal bore 220 near the lower section 225 of the SSSV 200. However, other types of valves such as ball valves, gate valves, butterfly valves, etc. are within the scope of the disclosure. As its name implies, a flapper valve opens and closes the SSSV 200 to fluid flow by rotation of a flapper 305 about a hinge on an axis transverse to an axis of the longitudinal bore 220. The flapper 305 can be actuated by an axially movable bore flow management actuator 310 (e.g., flow tube) that moves longitudinally within the longitudinal bore 220. The lower end of the bore flow management actuator 310 abuts the flapper 305 and causes the flapper 305 to rotate about its hinge and open the SSSV 200 to fluid flow upon a downward movement by the bore flow management actuator 310. Compression spring 315, for example positioned between a bore flow management actuator ring 320 and a flapper seat 325, normally biases the bore flow management actuator 310 in the upward direction such that when the lower end of the bore flow management actuator 310 is in the closed position it does not press downward upon the flapper 305. With the bore flow management actuator 310 in a retracted position, the flapper 305 is free to rotate about its axis in response to a biasing force exerted by, for example, a torsion spring (not shown). Flapper 305 can rotate such that its sealing surface contacts the flapper seat 325, thereby sealing longitudinal bore 220 to fluid flow.

In another embodiment (not shown), the bore closure assembly 250 is a ball valve disposed within longitudinal bore 220 near the lower end of SSSV 200. Ball valves, in certain embodiments, employ a rotatable spherical head or ball having a central flow passage which can be aligned with respect to the longitudinal bore 220 to open the SSSV 200 to fluid flow. Rotation of the ball valve through an angle of about 255 degrees or more will prevent flow through the longitudinal bore 220 of the ball valve, thereby closing the SSSV 200 to fluid flow. The ball valve can be biased to close the longitudinal bore 220 to fluid flow.

Turning briefly to FIG. 4, illustrated is one embodiment of the mechanical linkage 245, which includes a lead screw assembly 405 for an SSSV 200. The lead screw assembly 405 further comprises a lead screw 410, the upper end of which is connected to the clutch assembly 255 and the lower end of which is threaded into a drive nut 415. The lower end of the drive nut 415 is in contact with the upper end of power rod 420, which may be exposed to the wellbore fluid. The lower end of power rod 420 is in contact with and is fixedly connected to the bore flow management actuator ring 320. The drive nut 415, in at least one embodiment, is restrained from rotating, and in response to rotation of the lead screw 410 by the drive assembly 240 and clutch assembly 255, travels axially thereby moving the power rod 420 and the bore flow management actuator ring 320 downward to open the SSSV 200 to fluid flow. Alternatively, the drive nut 415 can be rotated while the lead screw 410 is held from rotating thereby causing relative motion between these components to actuate the bore flow management actuator 310. In this embodiment, the clutch assembly 255 might be coupled to the drive nut 415.

Referring again to FIGS. 2 and 3, the clutch assembly 255 is positioned and configured to help drive and hold the bore closure assembly 250 in the open position (commonly referred to as the "fully open" position) while the control signal is being received. Moreover, the clutch assembly 255 is configured to release the bore closure assembly 250 to return to the closed position upon interruption of the control signal, which is also referred to as a "hold" signal. The hold signal, in at least one embodiment, is communicated through a wired communication from a control center located at the surface, including something as simple as a power signal. In the event that the hold signal is interrupted (resulting in the clutch assembly 255 no longer receiving the hold signal), the clutch assembly 255 releases the bore closure assembly 250 to automatically return to the closed position.

The hold signal might be unintentionally interrupted, for example, by an event along the riser, wellhead, or production facility, or intentionally by a production operator seeking to shut-in the well in response to particular operating conditions or desires (such as maintenance, testing, production scheduling, etc.). In effect, the drive assembly 240 and clutch assembly 255 are what "cocks" or "arms" the SSSV 200 by driving the SSSV 200 from its normally biased closed position into the open position. The clutch assembly 255 also therefore serves as a "trigger" by holding the SSSV 200 in the open position during normal operating conditions in response to a hold signal. Interruption or failure of the hold signal causes the SSSV 200 to automatically "fire" closed.

Figure 5A:
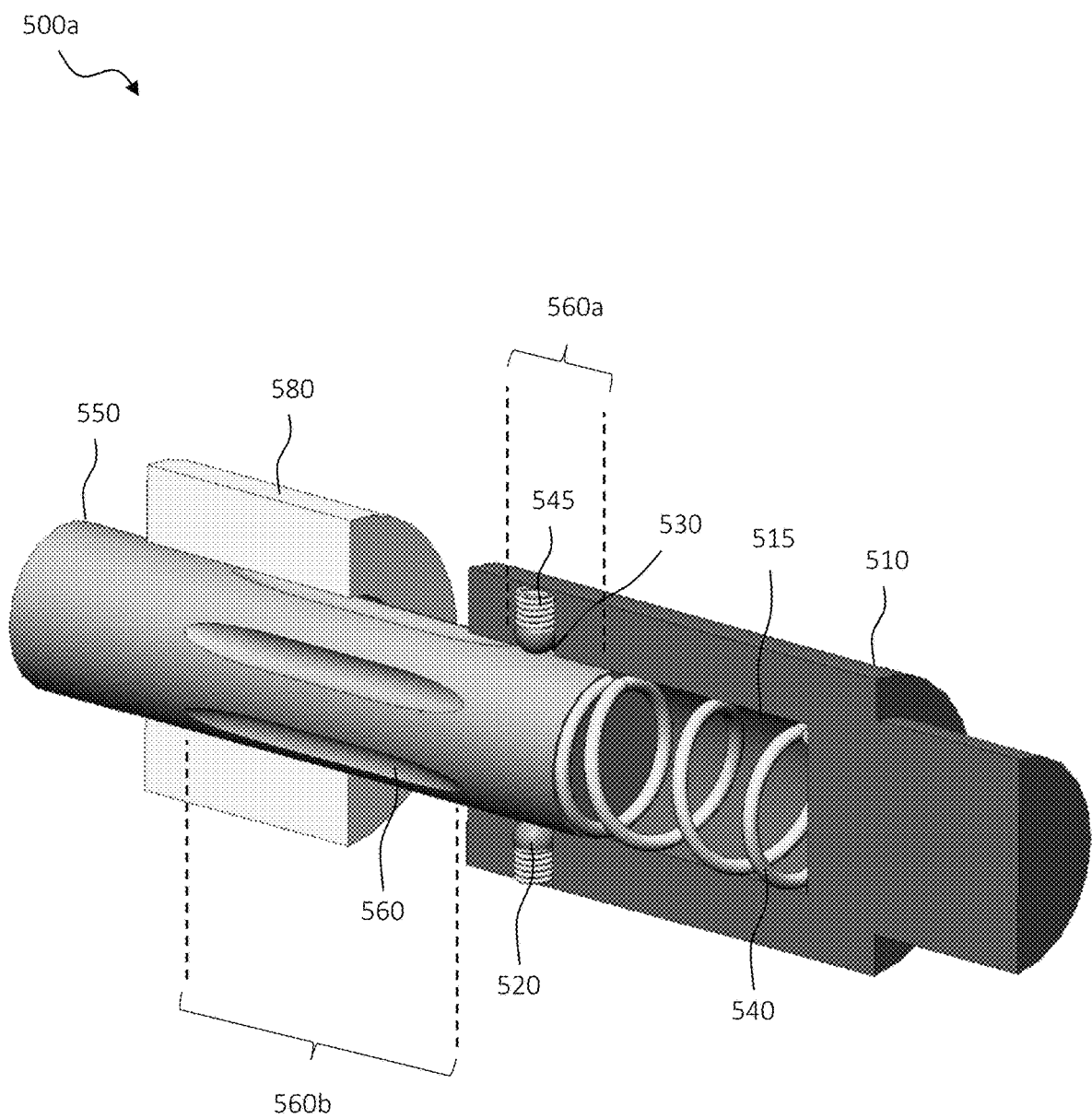
FIGS. 5A and 5B illustrate one embodiment of a clutch assembly, as might form part of an SSSV (e.g., SSSV of FIG. 1 or SSSV of FIGS. 2 through 4), designed and manufactured according to the present disclosure.
Figure 5B:
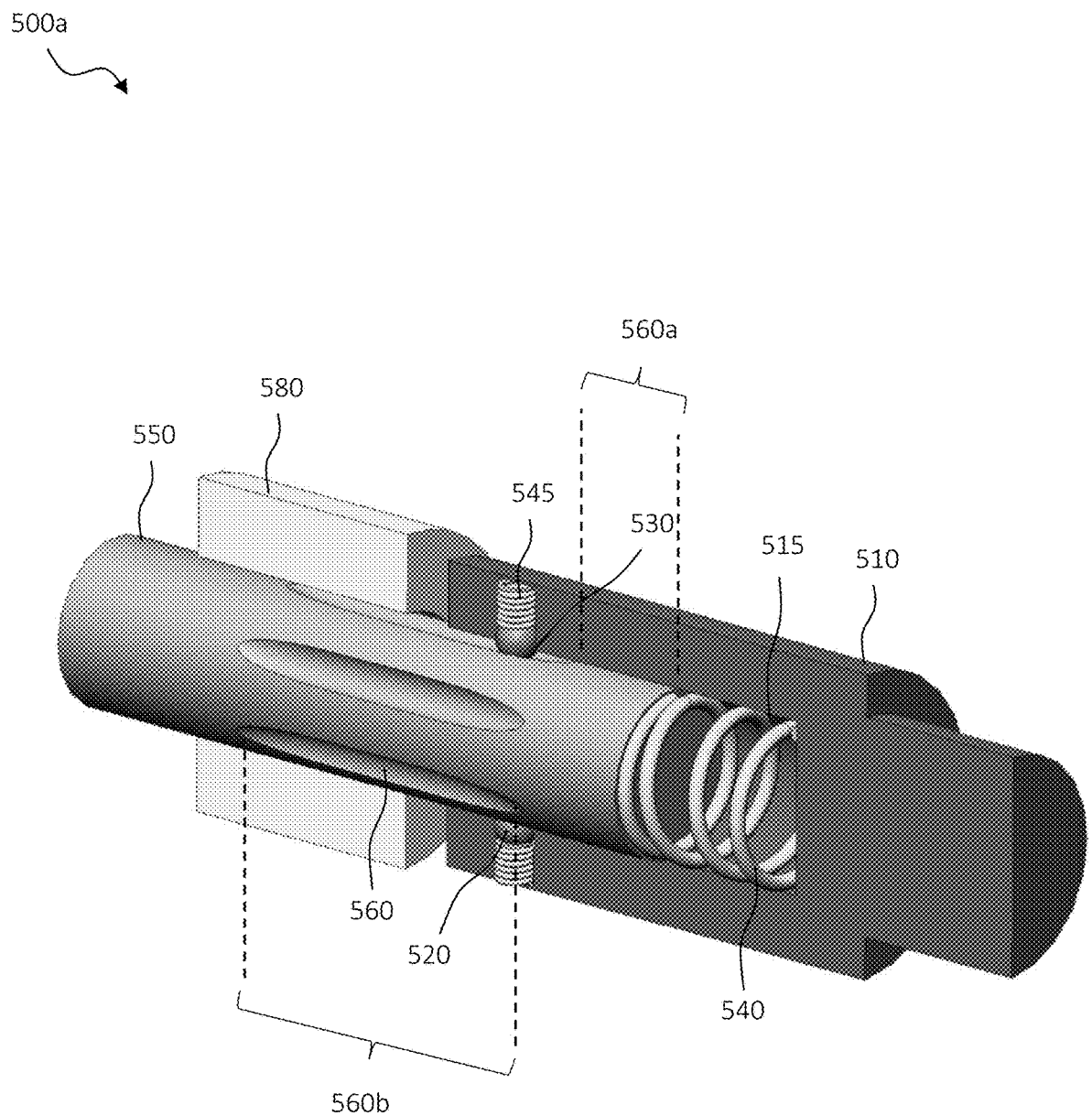

Turning now to FIGS. 5A and 5B, illustrated is one embodiment of a clutch assembly 500a, as might form part of an SSSV (e.g., SSSV 170 of FIG. 1 or SSSV 200 of FIGS. 2 through 4), designed and manufactured according to the present disclosure. While the clutch assembly according to the present disclosure is described in at least one embodiment as being used with an SSSV, or even within a downhole tool, other embodiments exist wherein the clutch assembly according to the present disclosure is not used with an SSSV, whether within a downhole tool or even an uphole tool. Thus, a clutch assembly according to the present disclosure is not limited to oil and gas applications. FIG. 5A illustrated the clutch assembly 500a in a de-coupled state, whereas FIG. 5B illustrate the clutch assembly 500a in a coupled state. The clutch assembly 500a, in the illustrated embodiment, includes an output coupler housing 510. The output coupler housing 510, in at least one embodiment, is configured to couple to a lead screw of a mechanical linkage (e.g., lead screw 410 of the mechanical linkage 245 of FIGS. 2 through 4). In accordance with one embodiment of the disclosure, the output coupler housing 510 has a central opening 515 extending at least partially therethrough. In at least one embodiment, the output coupler housing 510 comprises a ferromagnetic material. For instance, the output coupler housing 510 may comprise any ferromagnetic material and/or alloy thereof and remain within the scope of the disclosure.

In the illustrated embodiment, the clutch assembly 500a additionally includes an input shaft 550 located at least partially within the central opening 515 of the output coupler housing 510. The input shaft 550, in at least one embodiment, is configured to couple to an output of a drive assembly (e.g., drive assembly 240 of FIGS. 2 through 4). In at least one embodiment, the input shaft 550 comprises a non-ferromagnetic material. Other embodiments exist, however, where the input shaft 550 comprises a ferromagnetic material.

In the illustrated embodiment, the clutch assembly 500a additionally includes an electromagnet 580 coupled (e.g., physically coupled) to the input shaft 550. In at least one embodiment, the electromagnet 580 is configured to magnetically couple to the output coupler housing 510 to axially translate the output coupler housing 510 from a de-coupled state to a coupled state (e.g., when the electromagnet 580 is energized).

In accordance with one embodiment of the disclosure, the clutch assembly 500a additionally includes one or more grooves 560 located in one of an outer surface of the input shaft 550 or an inner surface of the central opening 515. In accordance with this embodiment of the disclosure, the clutch assembly 500a additionally includes one or more engagement members 520 located in the other of the inner surface of the central opening 515 or the outer surface of the input shaft 550. In accordance with this embodiment, the one or more engagement members 520 are configured to not engage with the one or more grooves 560 when the output coupler housing 510 is in the de-coupled state (e.g., as shown in FIG. 5A), and thus allow the input shaft 550 and the output coupler housing 510 to freely rotate relative to one another. Similarly, the one or more engagement members 520 are configured to engage with the one or more grooves 560 when the output coupler housing 510 is in the coupled state, and thus to rotationally fix the input shaft 550 and the output coupler housing 510 relative to one another. Accordingly, any rotation of the drive assembly, and thus input shaft 550, will only translate to the output coupler housing 510, and thus the lead screw of a mechanical linkage, when the output coupler housing 510 is in the coupled state. Otherwise, the drive assembly, and thus input shaft 550, and the output coupler housing 510, and thus the lead screw of a mechanical linkage, will freely rotate relative to one another.

The embodiment of FIGS. 5A and 5B illustrates one configuration wherein the one or more grooves 560 are located within an outer surface of the input shaft 550, and the one or more engagement members 520 are located in engagement member openings 530 extending into an inner surface of the central opening 515. Nevertheless, other embodiments (not shown) may exist wherein the one or more grooves 560 are located in the inner surface of the central opening 515, and the one or more engagement members 520 are located in engagement member openings that extend into the outer surface of the input shaft 550. Nevertheless, in the illustrated embodiment of FIGS. 5A and 5B, the one or more grooves 560 are positioned such that the one or more engagement members 520 are aligned with a non-grooved section 560a of the input shaft 550 when the output coupler housing 510 is in the de-coupled state (e.g., FIG. 5A), and are aligned with a grooved section 560b of the input shaft 550 when the output coupler housing 510 is in the coupled state (e.g., FIG. 5B).

In the embodiment of FIGS. 5A and 5B, the one or more grooves 560 are a plurality of splines. Further to the embodiment of FIGS. 5A and 5B, the one or more engagement members 520 are a plurality of ball members. The shape of the plurality of splines and the plurality of ball members are such that it is an easy transition as the plurality of ball members enter and exit the plurality of splines. For instance, in certain embodiments the plurality of ball members act as ball bearings, and thus may easily roll. The ability of the ball members to roll will decrease the friction required to release the plurality of splines from the plurality of ball members. Moreover, by having the ball members able to translate using a rolling motion, thus not having the same frictional forces that might occur with the meshing of gear faces with one another, any problems associated with inconsistent disengagement may be reduced.

Any number of grooves 560 and engagement members 520 are within the scope of the disclosure. For instance, one embodiment exists wherein a single groove 560 and single engagement member 520 is used. Another embodiment exists wherein two grooves 560 and two engagement members 520 are used. Yet other embodiments exist wherein four or more grooves 560 and four or more engagement members 520 are used.

In the illustrated embodiment of FIGS. 5A and 5B, the clutch assembly 500a further includes a shaft bias spring 540 located in the central opening 515 between the input shaft 550 and the output coupler housing 510. In this embodiment, the shaft bias spring 540 is configured to bias the output coupler housing 510 to the de-coupled state, for example when the electromagnet is de-energized. In those embodiments wherein the shaft bias spring 540 is employed, the output coupler housing 510 and electromagnet 580 must be designed to generate a sufficient attractive force to overcome the spring force of the shaft bias spring 540 (e.g., and any related friction), or else the clutch assembly 500a will not move between the de-coupled state (e.g., FIG. 5A) and coupled state (e.g., FIG. 5B), as required.

The shaft bias spring 540, on the other hand, should have enough spring force to return the clutch assembly from the coupled state (e.g., FIG. 5B) to the de-coupled state (e.g., FIG. 5A) when the electromagnet 580 is de-energized. For example, if the power (e.g., electric power) to the electromagnet 580 were to be intentionally removed, the shaft bias spring 540 could return (e.g., independently return) the output coupler housing 510 to the de-coupled state, and thus allow the bore flow management actuator to move from the flow state to the closed state. Similarly, if the power (e.g., electric power) to the electromagnet 580 were to be unintentionally cut, the shaft bias spring 540 could return (e.g., independently return) the output coupler housing 510 to the de-coupled state, and thus allow the bore flow management actuator to move from the flow state to the closed state. Thus, in at least one embodiment, the shaft bias spring 540 acts as a failsafe when power is lost.

Further to the embodiment of FIGS. 5A and 5B, the clutch assembly may additionally include an engagement member spring 545 (e.g., ball member spring) in each of the engagement member openings 530. In the illustrated embodiment, the engagement member springs 545 are positioned between each engagement member 520 (e.g., each ball member) and the output coupler housing 510. The engagement member springs 545, in the illustrated embodiment, are configured to bias each engagement member 520 (e.g., each ball member) toward a radially inward state. Accordingly, when the engagement members 520 transition from the non-grooved section 560a to the grooved section 560b as the output coupler housing 510 axially translates, the engagement members 520 will independently engage with the grooves 560.

Figure 5C:
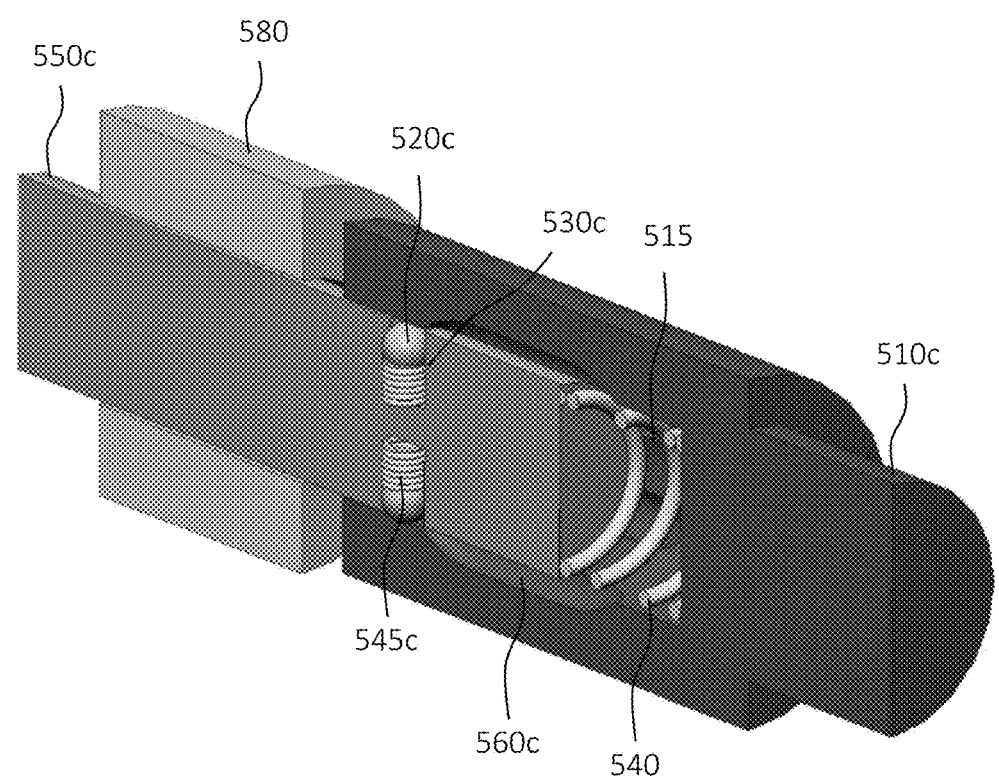
FIGS. 5C and 5D illustrate one embodiment of a clutch assembly, as might form part of an SSSV (e.g., SSSV of FIG. 1 or SSSV of FIGS. 2 through 4), designed and manufactured according to an alternative embodiment of the present disclosure.
Figure 5D:
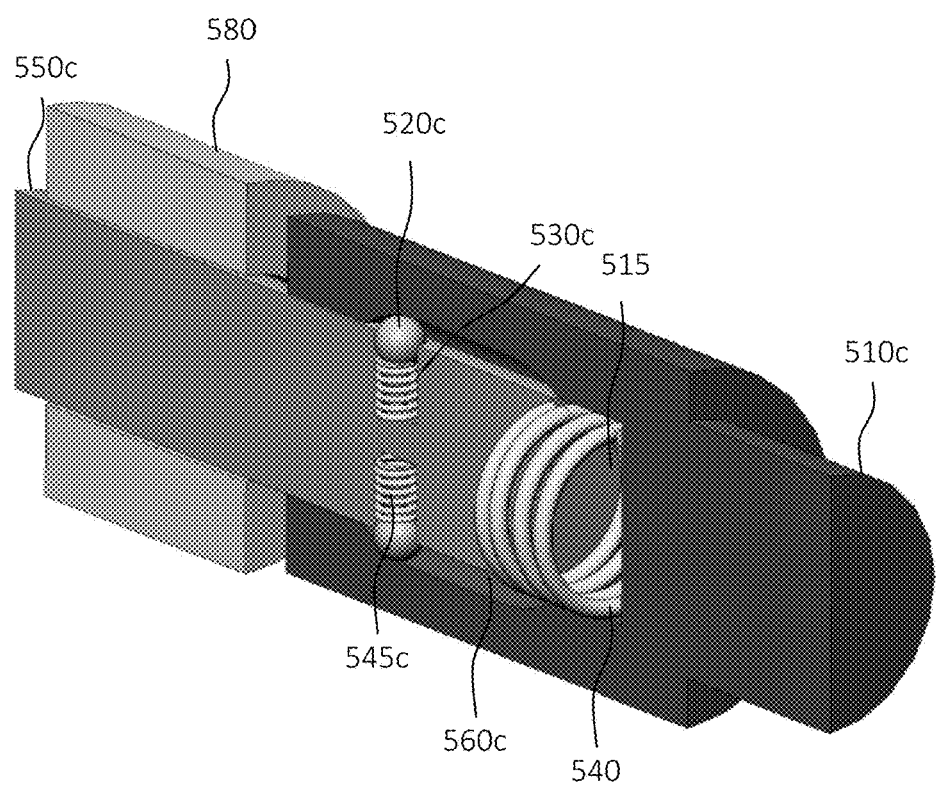

Turning now to FIGS. 5C and 5D, illustrated is one embodiment of a clutch assembly 500c, as might form part of an SSSV (e.g., SSSV 170 of FIG. 1 or SSSV 200 of FIGS. 2 through 4), designed and manufactured according to the present disclosure. The clutch assembly 500c is similar in many respects to the clutch assembly 500a of FIGS. 5A and 5B. Accordingly, like reference numbers have been used to indicate similar, if not identical, features.

The clutch assembly 500c differs, for the most part, from the clutch assembly 500a, in that the clutch assembly 500c positions its engagement members 520c and engagement member springs 545c in engagement member openings 530c in its input shaft 550c. Furthermore, the clutch assembly 500c of FIGS. 5C and 5D positions its one or more grooves 560c in the inner surface of the central opening 515 of the outer coupler housing 510c. Essentially, the clutch assembly 500c works opposite to the clutch assembly 500a, with the engagement members 520c extending radially outward into the one or more grooves 560c for the coupled state.

Turning now to FIGS. 6A and 6B, illustrated is a clutch assembly 600a, as might form part of an SSSV (e.g., SSSV 170 of FIG. 1 or SSSV 200 of FIGS. 2 through 4), designed and manufactured according to an alternative embodiment of the present disclosure. FIG. 6A illustrated the clutch assembly 600a in a de-coupled state, whereas FIG. 6B illustrate the clutch assembly 600a in a coupled state. The clutch assembly 600a shares many features with the clutch assembly 500a. Accordingly, the details discussed above with regard to the clutch assembly 500a may apply to the clutch assembly 600a.

The clutch assembly 600a, in the illustrated embodiment, includes an output coupler housing 610. The output coupler housing 610, in at least one embodiment, is configured to couple to a lead screw of a mechanical linkage (e.g., lead screw 410 of the mechanical linkage 245 of FIGS. 2 through 4). In accordance with one embodiment of the disclosure, the output coupler housing 610 has a central opening 615 extending at least partially therethrough. In at least one embodiment, the output coupler housing 610 comprises a non-ferromagnetic material. While not optimal in certain designs, other embodiments may exist wherein the output couple housing 610 comprises a ferromagnetic material and/or alloy thereof.

In the illustrated embodiment, the clutch assembly 600a additionally includes an input shaft 650 located at least partially within the central opening 615 of the output coupler housing 610. The input shaft 650, in at least one embodiment, is configured to couple to an output of a drive assembly (e.g., drive assembly 240 of FIGS. 2 through 4). In at least one embodiment, the input shaft 650 comprises a ferromagnetic material and/or alloy thereof.

In the illustrated embodiment, the clutch assembly 600a additionally includes an electromagnet 680 coupled (e.g., magnetically coupled) to the input shaft 650. In at least one embodiment, the electromagnet 680 is configured to magnetize the input shaft 650 when the electromagnet 680 is energized.

In accordance with one embodiment of the disclosure, the clutch assembly 600a additionally includes one or more grooves 660 (e.g., axial grooves in the embodiment of FIGS. 6A and 6B) located in an outer surface of the input shaft 650. In accordance with this embodiment of the disclosure, the clutch assembly 600a additionally includes one or more engagement members 620 located in engagement member openings 630 in the output coupler housing 610. The one or more engagement members 620, in at least the embodiment shown, comprise a ferromagnetic material and/or alloy thereof. In accordance with this embodiment, the one or more engagement members 620 are configured to not engage with the one or more grooves 660 when the output coupler housing 610 is in the de-coupled state (e.g., as shown in FIG. 6A), and thus allow the input shaft 650 and the output coupler housing 610 to freely rotate relative to one another. Similarly, the one or more engagement members 620 are configured to engage with the one or more grooves 660 when the output coupler housing 610 is in the coupled state, and thus to rotationally fix the input shaft 650 and the output coupler housing 610 relative to one another. Accordingly, any rotation of the drive assembly, and thus input shaft 650, will only translate to the output coupler housing 610, and thus the lead screw of a mechanical linkage, when the output coupler housing 610 is in the coupled state. Otherwise, the drive assembly, and thus input shaft 650, and the output coupler housing 610, and thus the lead screw of a mechanical linkage, will freely rotate relative to one another.

In accordance with one embodiment of the disclosure, the clutch assembly 600a additionally includes an engagement member spring 645 positioned in each of the engagement member openings 630, for example between each engagement member 620 and the output coupler housing 610. The engagement member springs 645, in at least one embodiment, are configured to bias the engagement members 620 toward a radially outward state (e.g., as shown in FIG. 6A)

In the embodiment of FIGS. 6A and 6B, energizing the electromagnet 680 magnetizes the input shaft 650, which in turn magnetically draws the one or more engagement members 620 into the one or more grooves 660, and thus rotationally fixes the input shaft 650 and output coupler housing 610 relative to one another. In contrast, when the electromagnet 680 is no longer energized (e.g., whether intentionally or unintentionally), the engagement member springs 645 return the engagement members 620 toward their radially outward state, and thus allow the input shaft 650 and the output coupler housing 610 to freely rotate relative to one another. This is in contrast to the embodiment of FIGS. 5A and 5B, wherein the electromagnet 580 axially moves the output coupler housing 510 to cause its one or more engagement members 520 to engage with its one or more grooves 560.

Turning now to FIGS. 6C and 6D, illustrated is one embodiment of a clutch assembly 600c, as might form part of an SSSV (e.g., SSSV 170 of FIG. 1 or SSSV 200 of FIGS. 2 through 4), designed and manufactured according to the present disclosure. The clutch assembly 600c is similar in many respects to the clutch assembly 600a of FIGS. 6A and 6B. Accordingly, like reference numbers have been used to indicate similar, if not identical, features.

The clutch assembly 600c differs, for the most part, from the clutch assembly 600a, in that the clutch assembly 600c positions its engagement members 620c and engagement member springs 645c in engagement member openings 630c in its input shaft 650c. Furthermore, the clutch assembly 600c of FIGS. 6C and 6D positions its one or more grooves 660c (e.g., axial grooves or non-axial grooves) in the inner surface of the central opening 515 of the outer coupler housing 610c.

Further to the embodiment of FIGS. 6C and 6D, the electromagnet 680c is coupled to the output coupler housing 610c, as opposed to the input shaft 650 of FIGS. 6A and 6B. Accordingly, the electromagnet 680c is configured to magnetize the output coupler housing 610c when the electromagnet 680c is energized. For instance, in one embodiment the output coupler housing 610c may comprise a ferromagnetic material, the one or more engagement members 620c may comprise a ferromagnetic material, and the input shaft 650c may comprise a non-ferromagnetic material. Accordingly, the output coupler housing 610c may magnetically draw the one or more engagement members 620c into the one or more grooves 660c and thereby be in the coupled state when the electromagnet 680c is energized. Essentially, the clutch assembly 600c works opposite to the clutch assembly 500a, with the engagement members 520c extending radially outward into the one or more grooves 560c for the coupled state (e.g., by way of the magnetized outer coupler housing 610c).

Turning now to FIGS. 7A through 7C, illustrated a clutch assembly 700, as might form part of an SSSV (e.g., SSSV 170 of FIG. 1 or SSSV 200 of FIGS. 2 through 4), designed and manufactured according to yet another alternative embodiment of the present disclosure. FIG. 7A illustrated the clutch assembly 700 in a de-coupled state, FIG. 7B illustrates the clutch assembly 700 in an initially coupled state, whereas FIG. 7C illustrates the clutch assembly 700 in a fully coupled state. The clutch assembly 700 shares many features with the clutch assemblies 500a, 500c, 600a, 600c. Accordingly, the details discussed above with regard to the clutch assembly 500a, 500c, 600a, 600c may apply to the clutch assembly 700.

The clutch assembly 700, in the illustrated embodiment, includes an output coupler housing 710. The output coupler housing 710, in at least one embodiment, is configured to couple to a lead screw of a mechanical linkage (e.g., lead screw 410 of the mechanical linkage 245 of FIGS. 2 through 4). In accordance with one embodiment of the disclosure, the output coupler housing 710 has a central opening 715 extending at least partially therethrough. In at least one embodiment, the output coupler housing 710 comprises a non-ferromagnetic material. While not optimal in certain designs, other embodiments may exist wherein the output couple housing 710 comprises a ferromagnetic material and/or alloy thereof.

In the illustrated embodiment, the clutch assembly 700 additionally includes an input shaft 750 located at least partially within the central opening 715 of the output coupler housing 710. The input shaft 750, in at least one embodiment, is configured to couple to an output of a drive assembly (e.g., drive assembly 240 of FIGS. 2 through 4). In at least one embodiment, the input shaft 750 comprises a ferromagnetic material and/or alloy thereof.

In the illustrated embodiment, the clutch assembly 700 additionally includes an electromagnet 780 coupled (e.g., magnetically coupled) to the input shaft 750. In at least one embodiment, the electromagnet 780 is configured to magnetize the input shaft 750 when the electromagnet 780 is energized.

In accordance with one embodiment of the disclosure, the clutch assembly 700 additionally includes one or more non-axial grooves 760a (e.g., curved, and/or helical, whether with a constant pitch or variable pitch) located in an outer surface of the input shaft 750. In accordance with this embodiment of the disclosure, the clutch assembly 700 additionally includes one or more first engagement members 720a located in first engagement member openings 730a in the output coupler housing 710. The one or more first engagement members 720a, in at least the embodiment shown, comprise a ferromagnetic material and/or alloy thereof. In accordance with this embodiment, the one or more first engagement members 720a are configured to not engage with the one or more non-axial grooves 760a when the output coupler housing 710 is in the de-coupled state (e.g., as shown in FIG. 7A), and thus allow the input shaft 750 and the output coupler housing 710 to freely rotate relative to one another. Similarly, the one or more first engagement members 720a are configured to engage with the one or more non-axial grooves 760a when the output coupler housing 710 is in the coupled state, and thus to rotationally fix the input shaft 750 and the output coupler housing 710 relative to one another. Accordingly, any rotation of the drive assembly, and thus input shaft 750, will only translate to the output coupler housing 710, and thus the lead screw of a mechanical linkage, when the output coupler housing 710 is in the coupled state. Otherwise, the drive assembly, and thus input shaft 750, and the output coupler housing 710, and thus the lead screw of a mechanical linkage, will freely rotate relative to one another.

In accordance with one embodiment of the disclosure, the clutch assembly 700 additionally includes a first engagement member spring 745a positioned in each of the first engagement member openings 730a, for example between each first engagement member 720a and the output coupler housing 710. The first engagement member springs 745a, in at least one embodiment, are configured to bias the first engagement members 720a toward a radially outward state (e.g., as shown in FIG. 7A).

In accordance with one embodiment of the disclosure, the clutch assembly 700 additionally includes one or more second grooves 760b (e.g., one or more second ball grooves) located in an outer surface of the input shaft 750. In accordance with this embodiment of the disclosure, the clutch assembly 700 additionally includes one or more second engagement members 720*b* (e.g., one or more ball members) located in second engagement member openings 730*b* in the output coupler housing 710. The one or more second engagement members 720*b*, in at least the embodiment shown, comprise a non-ferromagnetic material. In accordance with this embodiment, the one or more second engagement members 720*b* are configured to not engage with the one or more second grooves 760*b* when the output coupler housing 710 is in the de-coupled state or partially coupled state (e.g., as shown in FIGS. 7A and 7B, respectively), and thus allow the input shaft 750 and the output coupler housing 710 to at least partially rotate relative to one another. Similarly, the one or more second engagement members 720*b* are configured to engage with the one or more second grooves 760*b* when the output coupler housing 710 is in the coupled state, and thus to rotationally fix the input shaft 750 and the output coupler housing 710 relative to one another. Accordingly, any rotation of the drive assembly, and thus input shaft 750, will only translate to the output coupler housing 710, and thus the lead screw of a mechanical linkage, when the output coupler housing 710 is in the coupled state. Otherwise, the drive assembly, and thus input shaft 750, and the output coupler housing 710, and thus the lead screw of a mechanical linkage, will freely rotate relative to one another.

In accordance with one embodiment of the disclosure, the clutch assembly 700 additionally includes a second engagement member spring 745*b* positioned in each of the second engagement member openings 730*b*, for example between each second engagement member 720*b* and the output coupler housing 710. The second engagement member springs 745*b*, in at least one embodiment, are configured to bias the second engagement members 720*b* toward a radially inward state (e.g., as shown in FIG. 7A).

In the embodiment of FIGS. 7A through 7C, energizing the electromagnet 780 magnetizes the input shaft 750, which in turn magnetically draws the one or more engagement members 720*a* into the one or more non-axial grooves 760*a*, as shown in FIG. 7B. As the input shaft 750 continues to rotate, the non-axial grooves 760*a* and engagement members 720*a* draw the output coupler housing 710 toward the electromagnet 780, which in turn causes the one or more second engagement members 720*b* to engage with their associated one or more second grooves 760*b*, as shown in FIG. 7C, and thus rotationally fix the input shaft 750 and output coupler housing 710 relative to one another. In at least one embodiment, this occurs after the one or more first engagement members 720*a* have engaged with their associated one or more non-axial grooves 760*a*. In contrast, when the electromagnet 780 is no longer energized (e.g., whether intentionally or unintentionally), the first engagement member springs 745*a* return the first engagement members 720*a* toward their radially outward state, which in turn allows a shaft bias spring 740 to push the output coupler housing 710 away from the electromagnet 720, and thus allows the input shaft 750 and the output coupler housing 710 to again freely rotate relative to one another. It should be noted that the embodiment of FIGS. 7A through 7C may easily be reconfigured to use a similar input shaft and output coupler housing as discussed above with regard to FIGS. 6C and 6D and remain within the scope of the disclosure.

Aspects disclosed herein include:

A. A clutch assembly, the clutch assembly including: 1) an output coupler housing configured to couple to a lead screw of a mechanical linkage, the output coupler housing having a central opening extending at least partially therethrough; 2) an input shaft located at least partially within the central opening of the output coupler housing, the input shaft configured to couple to an output of a drive assembly; 3) an electromagnet coupled to the input shaft, the electromagnet configured to axially translate the output coupler housing from a de-coupled state to a coupled state when the electromagnet is energized; and 4) one or more grooves located in one of an outer surface of the input shaft or an inner surface of the central opening and one or more engagement members located in the other of the inner surface of the central opening or the outer surface of the input shaft, wherein: a) the one or more engagement members are configured to not engage with the one or more grooves when the output coupler housing is in the de-coupled state to allow the input shaft and the output coupler housing to freely rotate relative to one another; and 2) the one or more engagement members are configured to engage with the one or more grooves when the output coupler housing is in the coupled state to rotationally fix the input shaft and the output coupler housing relative to one another.

B. A subsurface safety valve (SSSV), the subsurface safety valve (SSSV) including: 1) a valve body including a longitudinal bore extending axially through the valve body, the longitudinal bore operable to convey subsurface production fluids there through; 2) a bore closure assembly disposed proximate a downhole end of the longitudinal bore; 3) a bore flow management actuator disposed in the central bore; 4) a mechanical linkage coupled to the bore flow management actuator, the mechanical linkage operable to move the bore flow management actuator between a closed state and a flow state to engage or disengage the bore closure assembly to determine a flow condition of the subsurface production fluids through the central bore; 5) a drive assembly coupled to the mechanical linkage; and 6) a clutch assembly positioned between the drive assembly and the mechanical linkage, the clutch assembly including: a) an output coupler housing configured to couple to a lead screw of the mechanical linkage, the output coupler housing having a central opening extending at least partially therethrough; b) an input shaft located at least partially within the central opening of the output coupler housing, the input shaft coupled to an output of the drive assembly; c) an electromagnet coupled to the input shaft, the electromagnet configured to axially translate the output coupler housing from a de-coupled state to a coupled state when the electromagnet is energized; and d) one or more grooves located in one of an outer surface of the input shaft or an inner surface of the central opening and one or more engagement members located in the other of the inner surface of the central opening or the outer surface of the input shaft, wherein: i) the one or more engagement members are configured to not engage with the one or more grooves when the output coupler housing is in the de-coupled state to allow the input shaft and the output coupler housing to freely rotate relative to one another; and ii) the one or more engagement members are configured to engage with the one or more grooves when the output coupler housing is in the coupled state to rotationally fix the input shaft and the output coupler housing relative to one another.

C. A method for operating a subsurface safety valve (SSSV), the method including: 1) providing a subsurface safety valve (SSSV) downhole within a wellbore, the subsurface safety valve (SSSV) including: a) a valve body including a longitudinal bore extending axially through the valve body, the longitudinal bore operable to convey subsurface production fluids there through; b) a bore closure assembly disposed proximate a downhole end of the longitudinal bore; c) a bore flow management actuator disposed in the central bore; d) a mechanical linkage coupled to the bore flow management actuator, the mechanical linkage operable to move the bore flow management actuator between a closed state and a flow state to engage or disengage the bore closure assembly to determine a flow condition of the subsurface production fluids through the central bore; e) a drive assembly coupled to the mechanical linkage; and f) a clutch assembly positioned between the drive assembly and the mechanical linkage, the clutch assembly including: i) an output coupler housing configured to couple to a lead screw of the mechanical linkage, the output coupler housing having a central opening extending at least partially therethrough; ii) an input shaft located at least partially within the central opening of the output coupler housing, the input shaft coupled to an output of the drive assembly; iii) an electromagnet coupled to the input shaft, the electromagnet configured to axially translate the output coupler housing from a de-coupled state to a coupled state when the electromagnet is energized; and iv) one or more grooves located in one of an outer surface of the input shaft or an inner surface of the central opening and one or more engagement members located in the other of the inner surface of the central opening or the outer surface of the input shaft, wherein the one or more engagement members are configured to not engage with the one or more grooves when the output coupler housing is in the de-coupled state to allow the input shaft and the output coupler housing to freely rotate relative to one another; and the one or more engagement members are configured to engage with the one or more grooves when the output coupler housing is in the coupled state to rotationally fix the input shaft and the output coupler housing relative to one another; and 2) energizing the electromagnet to axially move the output coupler housing from the de-coupled state to the coupled state and thereby rotationally fix the input shaft and the output coupler housing to move the bore flow management actuator from the closed state to the flow state.

D. A clutch assembly, the clutch assembly including: 1) an output coupler housing configured to couple to a lead screw of a mechanical linkage, the output coupler housing having a central opening extending at least partially therethrough; 2) an input shaft located at least partially within the central opening of the output coupler housing, the input shaft configured to couple to an output of a drive assembly; 3) one or more grooves located in an outer surface of the input shaft and one or more engagement members located in an inner surface of the central opening; and 4) an electromagnet coupled to the input shaft, the electromagnet configured to magnetize the input shaft when the electromagnet is energized, wherein: a) the one or more engagement members are configured to not engage with the one or more grooves when the electromagnet is de-energizing and thereby be in a de-coupled state and allow the input shaft and the output coupler housing to freely rotate relative to one another; and b) the one or more engagement members are configured to engage with the one or more grooves when the electromagnet is energized and thereby be in a coupled state and rotationally fix the input shaft and the output coupler housing relative to one another.

E. A subsurface safety valve (SSSV), the subsurface safety valve (SSSV) including: 1) a valve body including a longitudinal bore extending axially through the valve body, the longitudinal bore operable to convey subsurface production fluids there through; 2) a bore closure assembly disposed proximate a downhole end of the longitudinal bore; 3) a bore flow management actuator disposed in the central bore; 4) a mechanical linkage coupled to the bore flow management actuator, the mechanical linkage operable to move the bore flow management actuator between a closed state and a flow state to engage or disengage the bore closure assembly to determine a flow condition of the subsurface production fluids through the central bore; 5) a drive assembly coupled to the mechanical linkage; and 6) a clutch assembly positioned between the drive assembly and the mechanical linkage, the clutch assembly including: a) an output coupler housing configured to couple to a lead screw of a mechanical linkage, the output coupler housing having a central opening extending at least partially therethrough; b) an input shaft located at least partially within the central opening of the output coupler housing, the input shaft configured to couple to an output of a drive assembly; c) one or more grooves located in an outer surface of the input shaft and one or more engagement members located in an inner surface of the central opening; and d) an electromagnet coupled to the input shaft, the electromagnet configured to magnetize the input shaft when the electromagnet is energized, wherein: i) the one or more engagement members are configured to not engage with the one or more grooves when the electromagnet is de-energizing and thereby be in a de-coupled state and allow the input shaft and the output coupler housing to freely rotate relative to one another; and ii) the one or more engagement members are configured to engage with the one or more grooves when the electromagnet is energized and thereby be in a coupled state and rotationally fix the input shaft and the output coupler housing relative to one another.

F. A method for operating a subsurface safety valve (SSSV), the method including: 1) providing a subsurface safety valve (SSSV) downhole within a wellbore, the subsurface safety valve (SSSV) including: a) a valve body including a longitudinal bore extending axially through the valve body, the longitudinal bore operable to convey subsurface production fluids there through; b) a bore closure assembly disposed proximate a downhole end of the longitudinal bore; c) a bore flow management actuator disposed in the central bore; d) a mechanical linkage coupled to the bore flow management actuator, the mechanical linkage operable to move the bore flow management actuator between a closed state and a flow state to engage or disengage the bore closure assembly to determine a flow condition of the subsurface production fluids through the central bore; e) a drive assembly coupled to the mechanical linkage; and f) a clutch assembly positioned between the drive assembly and the mechanical linkage, the clutch assembly including: i) an output coupler housing configured to couple to a lead screw of a mechanical linkage, the output coupler housing having a central opening extending at least partially therethrough; ii) an input shaft located at least partially within the central opening of the output coupler housing, the input shaft configured to couple to an output of a drive assembly; iii) one or more grooves located in an outer surface of the input shaft and one or more engagement members located in an inner surface of the central opening; and iv) an electromagnet coupled to the input shaft, the electromagnet configured to magnetize the input shaft when the electromagnet is energized, wherein: the one or more engagement members are configured to not engage with the one or more grooves when the electromagnet is de-energizing and thereby be in a de-coupled state and allow the input shaft and the output coupler housing to freely rotate relative to one another; and the one or more engagement members are configured to engage with the one or more grooves when the electromagnet is energized and thereby be in a coupled state and rotationally fix the input shaft and the output coupler housing relative to one another; and 2) energizing the electromagnet to axially move the output coupler housing from the de-coupled state to the coupled state and thereby rotationally fix the input shaft and the output coupler housing to move the bore flow management actuator from the closed state to the flow state.

G. A clutch assembly, the clutch assembly including: 1) an output coupler housing configured to couple to a lead screw of a mechanical linkage, the output coupler housing having a central opening extending at least partially therethrough; 2) an input shaft located at least partially within the central opening of the output coupler housing, the input shaft configured to couple to an output of a drive assembly; 3) one or more grooves located in an inner surface of the central opening and one or more engagement members located in an outer surface of the input shaft; and 4) an electromagnet coupled to the output coupler housing, the electromagnet configured to magnetize the output coupler housing when the electromagnet is energized, wherein: a) the one or more engagement members are configured to not engage with the one or more grooves when the electromagnet is de-energizing and thereby be in a de-coupled state and allow the input shaft and the output coupler housing to freely rotate relative to one another; and b) the one or more engagement members are configured to engage with the one or more grooves when the electromagnet is energized and thereby be in a coupled state and rotationally fix the input shaft and the output coupler housing relative to one another.

H. A subsurface safety valve (SSSV), the subsurface safety valve (SSSV) including: 1) a valve body including a longitudinal bore extending axially through the valve body, the longitudinal bore operable to convey subsurface production fluids there through; 2) a bore closure assembly disposed proximate a downhole end of the longitudinal bore; 3) a bore flow management actuator disposed in the central bore; 4) a mechanical linkage coupled to the bore flow management actuator, the mechanical linkage operable to move the bore flow management actuator between a closed state and a flow state to engage or disengage the bore closure assembly to determine a flow condition of the subsurface production fluids through the central bore; 5) a drive assembly coupled to the mechanical linkage; and 6) a clutch assembly positioned between the drive assembly and the mechanical linkage, the clutch assembly including: a) an output coupler housing configured to couple to a lead screw of a mechanical linkage, the output coupler housing having a central opening extending at least partially therethrough; b) an input shaft located at least partially within the central opening of the output coupler housing, the input shaft configured to couple to an output of a drive assembly; c) one or more grooves located in an inner surface of the central opening and one or more engagement members located in an outer surface of the input shaft; and d) an electromagnet coupled to the output coupler housing, the electromagnet configured to magnetize the output coupler housing when the electromagnet is energized, wherein: i) the one or more engagement members are configured to not engage with the one or more grooves when the electromagnet is de-energizing and thereby be in a de-coupled state and allow the input shaft and the output coupler housing to freely rotate relative to one another; and ii) the one or more engagement members are configured to engage with the one or more grooves when the electromagnet is energized and thereby be in a coupled state and rotationally fix the input shaft and the output coupler housing relative to one another.

I. A method for operating a subsurface safety valve (SSSV), the method including: 1) providing a subsurface safety valve (SSSV) downhole within a wellbore, the subsurface safety valve (SSSV) including: a) a valve body including a longitudinal bore extending axially through the valve body, the longitudinal bore operable to convey subsurface production fluids there through; b) a bore closure assembly disposed proximate a downhole end of the longitudinal bore; c) a bore flow management actuator disposed in the central bore; d) a mechanical linkage coupled to the bore flow management actuator, the mechanical linkage operable to move the bore flow management actuator between a closed state and a flow state to engage or disengage the bore closure assembly to determine a flow condition of the subsurface production fluids through the central bore; e) a drive assembly coupled to the mechanical linkage; and f) a clutch assembly positioned between the drive assembly and the mechanical linkage, the clutch assembly including: i) an output coupler housing configured to couple to a lead screw of a mechanical linkage, the output coupler housing having a central opening extending at least partially therethrough; ii) an input shaft located at least partially within the central opening of the output coupler housing, the input shaft configured to couple to an output of a drive assembly; iii) one or more grooves located in an inner surface of the central opening and one or more engagement members located in an outer surface of the input shaft; and iv) an electromagnet coupled to the output coupler housing, the electromagnet configured to magnetize the output coupler housing when the electromagnet is energized, wherein: the one or more engagement members are configured to not engage with the one or more grooves when the electromagnet is de-energizing and thereby be in a de-coupled state and allow the input shaft and the output coupler housing to freely rotate relative to one another; and the one or more engagement members are configured to engage with the one or more grooves when the electromagnet is energized and thereby be in a coupled state and rotationally fix the input shaft and the output coupler housing relative to one another; and 2) energizing the electromagnet to cause the one or more engagement members to engage with the one or more grooves and thereby be in the coupled state and rotationally fix the input shaft and the output coupler housing relative to one another.

Aspects A, B, C, D, E, F, G, H, and I may have one or more of the following additional elements in combination: Element 1: wherein the output coupler housing comprises a ferromagnetic material. Element 2: further including a shaft bias spring located in the central opening between the input shaft and the output coupler housing, the shaft bias spring configured to bias the output coupler housing to the de-coupled state. Element 3: wherein the one or more grooves are located in the outer surface of the input shaft and the one or more engagement members are located in engagement member openings in the output coupler housing. Element 4: wherein the one or more grooves are positioned such that the one or more engagement members are aligned with a non-grooved section of the input shaft when the output coupler housing is in the de-coupled state and are aligned with a grooved section of the input shaft when the output coupler housing is in the coupled state. Element 5: wherein the one or more grooves are a plurality of splines and the one or more engagement members are a plurality of ball members. Element 6: further including a ball member spring positioned in each of the engagement member openings between each ball member and the output coupler housing, the ball member springs configured to bias the ball members toward a radially inward state. Element 7: wherein the one or more grooves are located in the inner surface of the output coupler housing and the one or more engagement members are located in engagement member openings in the input shaft. Element 8: further including de-energizing the electromagnet after energizing the electromagnet, the de-energizing allowing the output coupler housing to move from the coupled state back to the de-coupled state to allow the input shaft and the output coupler housing to freely rotate relative to one another. Element 9: further including a shaft bias spring located in the central opening between the input shaft and the output coupler housing, the shaft bias spring returning the output coupler housing from the coupled state back to the de-coupled state when de-energizing and thereby allowing the bore flow management actuator to move back to the closed state. Element 10: wherein the one or more grooves are located in the outer surface of the input shaft and the one or more engagement members are located in engagement member openings in the output coupler housing, and further wherein the one or more grooves are positioned such that the one or more engagement members are aligned with a non-grooved section of the input shaft when the output coupler housing is in the de-coupled state and are aligned with a grooved section of the input shaft when the output coupler housing is in the coupled state. Element 11: wherein the input shaft comprises a ferromagnetic material. Element 12: wherein the input shaft is configured to magnetically draw the one or more engagement members into the one or more grooves and thereby be in the coupled state when the electromagnet is energized. Element 13: wherein the one or more engagement members comprise a ferromagnetic material. Element 14: wherein the output coupler housing comprises a non-ferromagnetic material. Element 15: wherein the one or more grooves are one or more axial grooves. Element 16: wherein the one or more grooves are one or more non-axial grooves. Element 17: wherein the one or more non-axial grooves are one or more first non-axial grooves and the one or more engagement members are one or more first engagement members, and further including one or more second grooves located in an outer surface of the input shaft and one or more second engagement members located in an inner surface of the central opening. Element 18: wherein the one or more second engagement members are configured to engage with the one or more second grooves after the one or more first engagement members have engaged with and at least partially rotated within the one or more non-axial grooves. Element 19: wherein the one or more second engagement members are one or more non-ferromagnetic ball members located within one or more ball member openings in the outer coupler housing. Element 20: further including a ball member spring positioned in each of the ball member openings between each ball member and the outer coupler housing, the ball member springs configured to bias the ball members toward a radially inward state. Element 21: further including a shaft bias spring located in the central opening between the input shaft and the output coupler housing, the shaft bias spring configured to bias the output coupler housing to the de-coupled state. Element 22: wherein the one or more engagement members are located in engagement member openings in the output coupler housing, and further including an engagement member spring positioned in each of the engagement member openings between each engagement member and the outer coupler housing, the engagement member springs configured to bias the engagement members toward a radially outward state. Element 23: further including de-energizing the electromagnet after energizing the electromagnet, the de-energizing allowing the one or more engagement members to disengage with the one or more grooves and thereby be in the de-coupled state and allow the input shaft and the output coupler housing to freely rotate relative to one another. Element 24: further including a shaft bias spring located in the central opening between the input shaft and the output coupler housing, the shaft bias spring configured to bias the output coupler housing to the de-coupled state. Element 25: wherein the one or more engagement members are located in engagement member openings in the output coupler housing, and further including an engagement member spring positioned in each of the engagement member openings between each engagement member and the outer coupler housing, the de-energizing allowing the engagement member springs to return the engagement members to the radially outward state. Element 26: wherein the output coupler housing comprises a ferromagnetic material. Element 27: wherein the output coupler housing is configured to magnetically draw the one or more engagement members into the one or more grooves and thereby be in the coupled state when the electromagnet is energized. Element 28: wherein the one or more engagement members comprise a ferromagnetic material. Element 29: wherein the input shaft comprises a non-ferromagnetic material. Element 30: wherein the one or more grooves are one or more axial grooves. Element 31: wherein the one or more grooves are one or more non-axial grooves. Element 32: wherein the one or more engagement members are located in engagement member openings in the input shaft, and further including an engagement member spring positioned in each of the engagement member openings between each engagement member and the input shaft, the engagement member springs configured to bias the engagement members toward a radially inward state. Element 33: further including de-energizing the electromagnet after energizing the electromagnet, the de-energizing allowing the one or more engagement members to disengage with the one or more grooves and thereby be in the de-coupled state and allow the input shaft and the output coupler housing to freely rotate relative to one another. Element 34: wherein the output coupler housing comprises a ferromagnetic material, the one or more engagement members comprise a ferromagnetic material, and the input shaft comprises a non-ferromagnetic material. Element 35: wherein the one or more engagement members are located in engagement member openings in the input shaft, and further including an engagement member spring positioned in each of the engagement member openings between each engagement member and the input shaft, the engagement member springs configured to bias the engagement members toward a radially inward state.

Those skilled in the art to which this application relates will appreciate that other and further additions, deletions, substitutions and modifications may be made to the described embodiments.

What is claimed is:

1. A clutch assembly, comprising:
   an output coupler housing configured to couple to a lead screw of a mechanical linkage, the output coupler housing having a central opening extending at least partially therethrough;
   an input shaft located at least partially within the central opening of the output coupler housing, the input shaft configured to couple to an output of a drive assembly;
   an electromagnet coupled to the input shaft, the electromagnet configured to axially translate the output coupler housing from a de-coupled state to a coupled state when the electromagnet is energized; and
   one or more grooves located in one of an outer surface of the input shaft or an inner surface of the central opening and one or more engagement members located in the other of the inner surface of the central opening or the outer surface of the input shaft, wherein:
      the one or more engagement members are configured to not engage with the one or more grooves when the output coupler housing is in the de-coupled state to allow the input shaft and the output coupler housing to freely rotate relative to one another; and
      the one or more engagement members are configured to engage with the one or more grooves when the output coupler housing is in the coupled state to rotationally fix the input shaft and the output coupler housing relative to one another.

2. The clutch assembly as recited in claim 1, wherein the output coupler housing comprises a ferromagnetic material.

3. The clutch assembly as recited in claim 1, further including a shaft bias spring located in the central opening between the input shaft and the output coupler housing, the shaft bias spring configured to bias the output coupler housing to the de-coupled state.

4. The clutch assembly as recited in claim 1, wherein the one or more grooves are located in the outer surface of the input shaft and the one or more engagement members are located in engagement member openings in the output coupler housing.

5. The clutch assembly as recited in claim 4, wherein the one or more grooves are positioned such that the one or more engagement members are aligned with a non-grooved section of the input shaft when the output coupler housing is in the de-coupled state and are aligned with a grooved section of the input shaft when the output coupler housing is in the coupled state.

6. The clutch assembly as recited in claim 5, wherein the one or more grooves are a plurality of splines and the one or more engagement members are a plurality of ball members.

7. The clutch assembly as recited in claim 6, further including a ball member spring positioned in each of the engagement member openings between each ball member and the output coupler housing, the ball member springs configured to bias the ball members toward a radially inward state.

8. The clutch assembly as recited in claim 1, wherein the one or more grooves are located in the inner surface of the output coupler housing and the one or more engagement members are located in engagement member openings in the input shaft.

9. A subsurface safety valve (SSSV), comprising:
   a valve body including a longitudinal bore extending axially through the valve body, the longitudinal bore operable to convey subsurface production fluids there through;
   a bore closure assembly disposed proximate a downhole end of the longitudinal bore;
   a bore flow management actuator disposed in the central bore;
   a mechanical linkage coupled to the bore flow management actuator, the mechanical linkage operable to move the bore flow management actuator between a closed state and a flow state to engage or disengage the bore closure assembly to determine a flow condition of the subsurface production fluids through the central bore;
   a drive assembly coupled to the mechanical linkage; and
   a clutch assembly positioned between the drive assembly and the mechanical linkage, the clutch assembly including:
      an output coupler housing configured to couple to a lead screw of the mechanical linkage, the output coupler housing having a central opening extending at least partially therethrough;
      an input shaft located at least partially within the central opening of the output coupler housing, the input shaft coupled to an output of the drive assembly;
      an electromagnet coupled to the input shaft, the electromagnet configured to axially translate the output coupler housing from a de-coupled state to a coupled state when the electromagnet is energized; and
      one or more grooves located in one of an outer surface of the input shaft or an inner surface of the central opening and one or more engagement members located in the other of the inner surface of the central opening or the outer surface of the input shaft, wherein:
         the one or more engagement members are configured to not engage with the one or more grooves when the output coupler housing is in the de-coupled state to allow the input shaft and the output coupler housing to freely rotate relative to one another; and
         the one or more engagement members are configured to engage with the one or more grooves when the output coupler housing is in the coupled state to rotationally fix the input shaft and the output coupler housing relative to one another.

10. The subsurface safety valve (SSSV) as recited in claim 9, wherein the output coupler housing comprises a ferromagnetic material.

11. The subsurface safety valve (SSSV) as recited in claim 9, further including a shaft bias spring located in the central opening between the input shaft and the output coupler housing, the shaft bias spring configured to bias the output coupler housing to the de-coupled state.

12. The subsurface safety valve (SSSV) as recited in claim 9, wherein the one or more grooves are located in the outer surface of the input shaft and the one or more engagement members are located in engagement member openings in the output coupler housing.

13. The subsurface safety valve (SSSV) as recited in claim 12, wherein the one or more grooves are positioned such that the one or more engagement members aligned with a non-grooved section of the input shaft when the output coupler housing is in the de-coupled state and aligned with a grooved section of the input shaft when the output coupler housing is in the coupled state.

14. The subsurface safety valve (SSSV) as recited in claim 13, wherein the one or more grooves are a plurality of splines and the one or more engagement members are a plurality of ball members.

15. The subsurface safety valve (SSSV) as recited in claim 14, further including a ball member spring positioned in each of the engagement member openings between each ball member and the output coupler housing, the ball member springs configured to bias the ball members toward a radially inward state.

16. The subsurface safety valve (SSSV) as recited in claim 9, wherein the one or more grooves are located in the inner surface of the output coupler housing and the one or more engagement members are located in engagement member openings in the input shaft.

17. A method for operating a subsurface safety valve (SSSV), comprising:
providing a subsurface safety valve (SSSV) downhole within a wellbore, the subsurface safety valve (SSSV) including:
a valve body including a longitudinal bore extending axially through the valve body, the longitudinal bore operable to convey subsurface production fluids there through;
a bore closure assembly disposed proximate a downhole end of the longitudinal bore;
a bore flow management actuator disposed in the central bore;
a mechanical linkage coupled to the bore flow management actuator, the mechanical linkage operable to move the bore flow management actuator between a closed state and a flow state to engage or disengage the bore closure assembly to determine a flow condition of the subsurface production fluids through the central bore;
a drive assembly coupled to the mechanical linkage; and
a clutch assembly positioned between the drive assembly and the mechanical linkage, the clutch assembly including:
an output coupler housing configured to couple to a lead screw of the mechanical linkage, the output coupler housing having a central opening extending at least partially therethrough;
an input shaft located at least partially within the central opening of the output coupler housing, the input shaft coupled to an output of the drive assembly;
an electromagnet coupled to the input shaft, the electromagnet configured to axially translate the output coupler housing from a de-coupled state to a coupled state when the electromagnet is energized; and
one or more grooves located in one of an outer surface of the input shaft or an inner surface of the central opening and one or more engagement members located in the other of the inner surface of the central opening or the outer surface of the input shaft, wherein:
the one or more engagement members are configured to not engage with the one or more grooves when the output coupler housing is in the de-coupled state to allow the input shaft and the output coupler housing to freely rotate relative to one another; and
the one or more engagement members are configured to engage with the one or more grooves when the output coupler housing is in the coupled state to rotationally fix the input shaft and the output coupler housing relative to one another; and
energizing the electromagnet to axially move the output coupler housing from the de-coupled state to the coupled state and thereby rotationally fix the input shaft and the output coupler housing to move the bore flow management actuator from the closed state to the flow state.

18. The method as recited in claim 17, further including de-energizing the electromagnet after energizing the electromagnet, the de-energizing allowing the output coupler housing to move from the coupled state back to the de-coupled state to allow the input shaft and the output coupler housing to freely rotate relative to one another.

19. The method as recited in claim 18, further including a shaft bias spring located in the central opening between the input shaft and the output coupler housing, the shaft bias spring returning the output coupler housing from the coupled state back to the de-coupled state when de-energizing and thereby allowing the bore flow management actuator to move back to the closed state.

20. The method as recited in claim 17, wherein the one or more grooves are located in the outer surface of the input shaft and the one or more engagement members are located in engagement member openings in the output coupler housing, and further wherein the one or more grooves are positioned such that the one or more engagement members are aligned with a non-grooved section of the input shaft when the output coupler housing is in the de-coupled state and are aligned with a grooved section of the input shaft when the output coupler housing is in the coupled state.

* * * * *